(12) United States Patent
Richardson

(10) Patent No.: US 12,627,754 B2
(45) Date of Patent: *May 12, 2026

(54) SYSTEM, METHOD, AND APPARATUS FOR COMMON CONTACT MANAGEMENT

(71) Applicant: Steve Richardson, Tampa, FL (US)

(72) Inventor: Steve Richardson, Tampa, FL (US)

( * ) Notice: Subject to any disclaimer, the term of this patent is extended or adjusted under 35 U.S.C. 154(b) by 346 days.

This patent is subject to a terminal disclaimer.

(21) Appl. No.: 18/230,931

(22) Filed: Aug. 7, 2023

(65) Prior Publication Data

US 2023/0379407 A1 Nov. 23, 2023

Related U.S. Application Data

(63) Continuation-in-part of application No. 17/088,103, filed on Nov. 3, 2020, now Pat. No. 11,762,843, which is a continuation-in-part of application No. 16/232,095, filed on Dec. 26, 2018, now Pat. No. 10,863,014, which is a continuation-in-part of application No. 15/381,306, filed on Dec. 16, 2016, now Pat. No. 10,205,812.

(51) Int. Cl.
*H04M 1/274* (2006.01)
*H04M 3/42* (2006.01)
(52) U.S. Cl.
CPC ....... *H04M 1/274* (2013.01); *H04M 3/42059* (2013.01); *H04M 3/42068* (2013.01)
(58) Field of Classification Search
CPC ............. H04M 1/274; H04M 3/42102; H04M 3/4931; H04M 3/42068
USPC ........................................................ 455/415
See application file for complete search history.

(56) References Cited

U.S. PATENT DOCUMENTS

| | | | |
|---|---|---|---|
| 6,269,369 B1 | 7/2001 | Robertson | |
| 7,797,542 B2 | 9/2010 | Tachibana et al. | |
| 8,103,251 B2 * | 1/2012 | Yang ...................... | H04L 51/48 |
| | | | 455/411 |
| 8,820,083 B2 | 9/2014 | Davidson et al. | |
| 2004/0215793 A1 | 10/2004 | Ryan et al. | |
| 2006/0190547 A1 | 8/2006 | Bhogal | |
| 2007/0238443 A1 | 10/2007 | Richardson | |
| 2009/0036163 A1 | 2/2009 | Kimbrell | |

(Continued)

FOREIGN PATENT DOCUMENTS

WO WO-2015043260 A1 * 4/2015 ........... H04L 67/306

*Primary Examiner* — Jirapon Tulop
(74) *Attorney, Agent, or Firm* — Larson & Larson; Frank Liebenow

(57) ABSTRACT

A system for providing management of contact records includes a contact record that is associated with an initiator and is indexed by a phone number of the originator. To initiate delivery of some part of the contact record of the originator, the originator enters a phone number of a recipient into an application and some part of the fields of the contact record are transmitted to a device of the recipient where they are stored in the recipient's contact list. In some embodiments, the part of the fields sent is determined by a relationship between the initiator and the recipient such as family, co-worker, acquaintance, friend, stranger, etc. When changes are made to the contact record, the recipient device will receive updated information. Features are provided for automatic deletion of the subset of fields from the recipient device upon request or after a specified time period.

16 Claims, 31 Drawing Sheets

(56)                    References Cited

U.S. PATENT DOCUMENTS

| 2009/0240657 | A1 | 9/2009  | Grigsby        |
| 2009/0313299 | A1 | 12/2009 | Bonev          |
| 2010/0223097 | A1 | 9/2010  | Kramer et al.  |
| 2010/0272245 | A1 | 10/2010 | Brunson        |
| 2011/0258159 | A1 | 10/2011 | Mitchell       |
| 2012/0185547 | A1 | 7/2012  | Hugg           |
| 2014/0066044 | A1 | 3/2014  | Ramnani        |
| 2014/0164529 | A1 | 6/2014  | Kleppmann      |
| 2015/0356649 | A1 | 12/2015 | Glass          |
| 2016/0124948 | A1 | 5/2016  | Horling et al. |
| 2016/0253083 | A1 | 9/2016  | Lee            |

* cited by examiner

470

10

Contacts

Search:

Smith, John

Thomas, J
Thai Restaurant

Williams, R

472

474

476

SYSTEM, METHOD, AND APPARATUS FOR COMMON CONTACT MANAGEMENT

FIELD OF THE INVENTION

This invention relates to contact lists and more particularly to a system for providing unambiguous contact information.

BACKGROUND OF THE INVENTION

Nowadays, almost everybody has a smartphone. Many use their smartphone for messaging, email, taking pictures, etc., but in reality, the birth of the smartphone came from early cellular phones that provided only voice communications. Each smartphone has a unique phone number; unique world-wide when the country code is included.

As people often find it easier to remember a person's or an establishment's name as opposed to a ten-digit phone number, phone directories came about just as in the past, phone books and rotary phone indexes were used for land-line phones. The concept was initially simple—an entry (e.g. card or record) was indexed by the person's or establishment's name and contained an address (physical address) and phone number of the person or establishment.

As smartphones became popular, similar systems were created through software on the smartphones. Such "phone-books" are used mostly to store records containing phone numbers of people and establishments that are commonly called. These phonebooks are typically indexed by the person's or establishment's name or alias such as "mom," "dad," "Joe's Pizzeria," etc. This made using smartphones much easier as both voice calling and messaging is now directed, for example, to "mom."

As capabilities and storage of smartphones increased, more information has been stored in each user's phonebook, including addresses, birthdates, anniversaries, personal information, work/office information, vehicle identification numbers, etc.

Everybody who has a smartphone has a phone book, but in general, prior phonebook entries were generally entered manually (at least initially) or through various automated schemes such as scanning of business cards using the smartphone's camera or electronic transfer from one phone to another phone using virtual business cards (e.g. VCF). In such, when a new smartphone is purchased, the phonebook must be transferred from the old smartphone to the new smartphone as storage for the phonebook records was within the memory of the user's smartphone.

Phonebook records that were created manually often lacked data accuracy as they depend upon whoever enters the data; usually using the smartphone's on-screen keyboard and limit display size. This often leads to errors, duplicate entries, etc. Further, certain complexities are often overlooked by users such as multiple phone number entries for home, office, cell, etc., making difficult to determine which number to call at a later time.

Updating locally stored phonebook records is also a tenuous ordeal. When one of your contacts change their phone number, email address, name (e.g. after marriage), address, etc., or adds new information, that person usually sends out a message to everybody in their phonebook requesting that everybody make updates. This is not an easy task since there are many records in one's phonebook that are one-way (e.g. calls are only made to a restaurant, not from the restaurant), many records are not up-to-date (e.g. the phone number is wrong), and some records one does not want to send requests for updates (e.g. ex-girlfriend or ex-boyfriend). If the contact information in your phonebook is outdated, you cannot inform that person of your new contact information and will likely lose touch with that person.

Personal phonebook records become the property of the smartphone owner, in that, once created, it is up to the smartphone owner to guard the information, update the information, and maintain the information. Further, there is no way to limit the life of the information in any way except to ask the other smartphone owner to delete your information.

In addition, smartphone records are flat. If you give someone your business card or VCF, that person gets all of the information on your business card or VCF. For paper business cards, if you do not want that person to have your cellular number, you have to blackout that part of the business card, but once provide to the person, there is no taking it back.

What is needed is a system that will provide a ubiquitous and unique management of contact records across multiple platforms.

SUMMARY OF THE INVENTION

A system for providing management of contact records includes a single record per user that is primarily indexed by the owner's phone number. The contact records are network accessed through any of various cellular and data networks by various devices and cached locally on such devices by way of permission from the owner of each record. In this way, the owner of each record has the ability to deny access to some or all of the information stored in the contact record at any time. As changes are made to a contact record, all others that have access to that contact record receive updated information. Duplicates are eliminated as no two individuals or establishments share the same phone number, though an individual is free to use the same number for a personal number as well as their business.

In one embodiment, a system for managing contact records includes an initiator device, a recipient device, and a server. The server has storage for storing contact records and each contact record includes a name and phone number of an owner of that contact record. At least one of the contact records is a contact record associated with an owner of the initiator device. A phone number of the recipient device (recipient phone number) is keyed into an application running on the initiator device. Responsive to receiving the phone number, the application running on the initiator device sends a transaction that included the recipient phone number to the sever through a network. Responsive to the transaction, the server determines the recipient device based upon the phone number and the server sends an invitation transaction to a contact management application that is running on the recipient device. The contact management application running on the recipient device receives the invitation transaction and prompts for a user input (accept or reject). After the contact management application running on the recipient device receives the user input, if the user input indicates acceptance, the contact management application running on the recipient device sends an acceptance transaction to the server. After the server receives the acceptance transaction, the server sends at least part of the contact record associated with the owner of the initiator device to the contact management application running on recipient device and after the contact management application running on recipient device receives the contact record associated with the owner of the initiator device, the contact management application running on recipient device stores the at least part of the contact record associated with the owner of the initiator device in a phone contact list that is local to the recipient device for later access for contacting an initiator.

In another embodiment, a method for contact management includes keying a phone number of a recipient device into an application running on an initiator device. Responsive to the phone number, a transaction is sent from the application running on the initiator device to a server, the transaction includes the phone number. The server has access to a plurality of contact records, each contact record comprising field including at least a name field and phone number field. The plurality of contact records including a contact record associated with an owner of the initiator device. Responsive to receiving the transaction, the server sends an invitation transaction to a contact management application running on the recipient device. Responsive to receiving the invitation transaction, the contact management application running on the recipient device prompts for acceptance, and responsive to receiving an input indicating acceptance, the contact management application running on the recipient device sends an acceptance transaction to the server. Responsive to receiving the acceptance transaction, the server selects a set of fields from at least part of the contact record associated with the owner of the initiator device and sends a data transaction including the set of fields to the contact management application running on the recipient device. Responsive to receiving the data transaction, the contact management application running on the recipient device stores the set of fields in a phone contact list local to the recipient device and, until access by the recipient device to the set of fields is revoked, the recipient device has access to the set of fields for viewing and for initiating calling and/or messaging.

In another embodiment, program instructions tangibly embodied in a non-transitory storage medium comprising at least one instruction configured to implement a system for providing management of contact records, wherein the at least one instruction includes computer readable instructions executed by a first processor of an initiator device for causing the initiator device to prompt for a phone number of a recipient device. Responsive to inputting of the phone number, the computer readable instructions executed by the first processor of the initiator device causes the first processor to send a transaction to a sever, the transaction comprising the phone number. Responsive to the server receiving the transaction, computer readable instructions executed by a second processor of the server causes the second processor to send an invitation transaction to the recipient device. Responsive to receiving the invitation transaction at the recipient device, computer readable instructions executed by a third processor of the recipient device causes the third processor to prompt for an acceptance. Responsive to inputting of the acceptance at the recipient device, the computer readable instructions executed by the third processor of the recipient device causes the third processor to send an acceptance transaction to the server. Responsive to receiving the acceptance transaction at the server, the computer readable instructions executed by the second processor of the server causes the second processor to send a data transaction comprising a set of fields of a contact record associated with the owner of the initiator device to the recipient device and Responsive to receiving the data transaction at the recipient device, the computer readable instructions executed by the third processor of the recipient device cause the third processor to store the set of fields in a phone book record local to the recipient device until revoked.

In another embodiment, a system for managing contact records includes an initiator device, a recipient device, and a server, the recipient device having a recipient phone number associated there with. The server has storage for storing contact records and each contact record has a name, and phone number of an owner of the contact record. One of the contact records is a contact record that is associated with (an owner of) the initiator device. The recipient phone number is inputted into an application running on the initiator device and responsive to receiving the recipient phone number, the application running on the initiator device sends a transaction that includes recipient phone number to the sever through a network. Responsive to the transaction, the server addresses the recipient device based upon the phone number and the server sends an invitation transaction to a contact management application running on the recipient device. The contact management application running on the recipient device receives the invitation transaction and prompts for a user input (e.g. accept or reject). After the contact management application running on the recipient device receives the user input, when the user input indicates acceptance, the contact management application running on the recipient device sends an acceptance transaction to the server, and after the server receives the acceptance transaction, the server sends at least part of the contact record associated with the initiator device to the contact management application running on recipient device. After the contact management application running on recipient device receives the at least part of the contact record associated with the initiator device, the contact management application running on recipient device stores the at least part of the contact record associated with the initiator device in a phone contact list that is local to the recipient device for later access.

In another embodiment, a method for contact management includes keying a recipient phone number of a recipient device into an application running on an initiator device. Responsive to the recipient phone number, the application running on the initiator device sends a transaction that includes the recipient phone number to a server. The server has access to a plurality of contact records, each contact record comprising fields including at least a name field and a phone number field, the plurality of contact records including a contact record associated with an owner of the initiator device. Responsive to receiving the transaction, the server sends an invitation transaction to a contact management application running on the recipient device. Responsive to receiving the invitation transaction, the contact management application running on the recipient device prompts for acceptance and responsive to receiving an input indicating acceptance, the contact management application running on the recipient device sending an acceptance transaction to the server. Responsive to receiving the acceptance transaction, the server selects a set of fields from the contact record associated with the owner of the initiator device and the server sends a data transaction comprising the set of fields to the contact management application running on the recipient device. Responsive to receiving the data transaction, the contact management application running on the recipient device stores the set of fields in a phone contact list local to the recipient device.

In another embodiment, program instructions tangibly embodied in a non-transitory storage medium comprising at least one instruction configured to implement a system for providing management of contact records, wherein the at least one instruction includes computer readable instructions executed by a first processor of an initiator device causing the initiator device to prompt for a recipient phone number corresponding to a recipient device. Responsive to inputting of the recipient phone number, the computer readable instructions executed by the first processor of the initiator device causing the first processor to send a transaction that includes the recipient phone number to a server. Responsive to receiving the transaction by the server, computer readable instructions executed by a second processor of the server causing the second processor to send an invitation transaction to the recipient device, the invitation transaction including a name associated with the initiator device. Responsive to receiving the invitation transaction at the recipient device, computer readable instructions executed by a third processor of the recipient device causing the third processor to prompt for an acceptance. Responsive to inputting of the acceptance at the recipient device, the computer readable instructions executed by the third processor of the recipient device causing the third processor to send an acceptance transaction to the server. Responsive to receiving the acceptance transaction at the server, the computer readable instructions executed by the second processor of the server causing the second processor to send a data transaction comprising a set of fields from a contact record associated with an owner of the initiator device to the recipient device, the set of fields being any or all fields of the contact record associated with the owner of the initiator device. Responsive to receiving the data transaction at the recipient device, the computer readable instructions executed by the third processor of the recipient device causing the third processor to store the set of fields in a phone book record local to the recipient device.

BRIEF DESCRIPTION OF DRAWINGS

The invention can be best understood by those having ordinary skill in the art by reference to the following detailed description when considered in conjunction with the accompanying drawings in which.

DETAILED DESCRIPTION OF THE INVENTION

Figure 1:
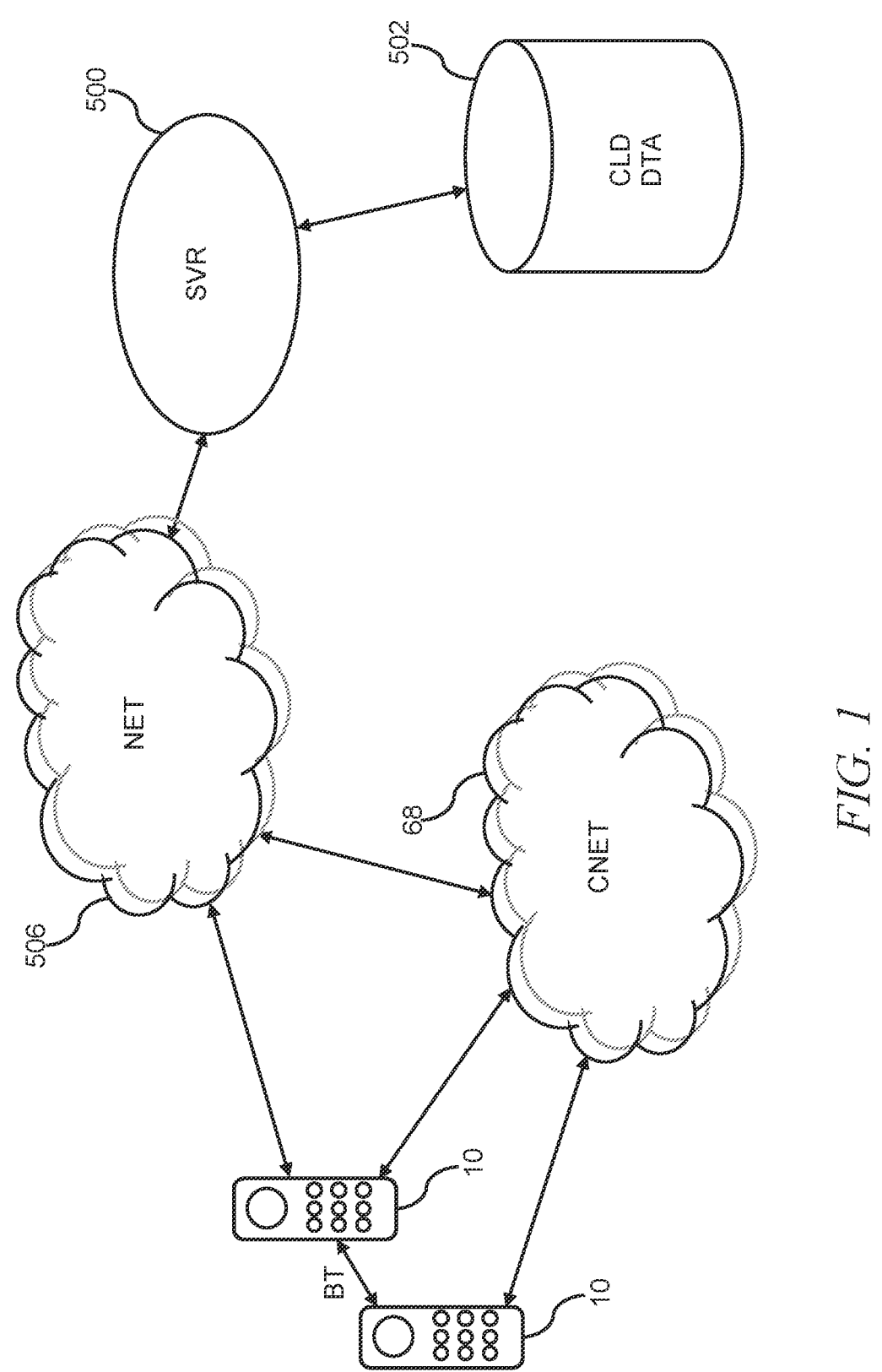
FIG. 1 illustrates a data connection diagram of the system for common contact management.

Reference will now be made in detail to the presently preferred embodiments of the invention, examples of which are illustrated in the accompanying drawings. Throughout the following detailed description, the same reference numerals refer to the same elements in all figures.

Throughout this description, the term, "contact record," describes a data record that is stored/transferred containing information typically for providing phonebook contacts and other uses. The primary key to finding the contact record is a telephone number and other information is stored in fields of the contact record. Some exemplary data that is stored in fields of the contact records includes, but is not limited to, the name associated with the telephone number (e.g. a person's name or establishment name), personal information (e.g., home address, date-of-birth), business information (e.g., business address), personal information (likes, hobbies, favorites), etc. It is fully anticipated that in some embodiments, less information is stored in some or all phonebook records, minimally the phone number and name, the additional information being optional.

The description uses the term initiator as a user who initiates sharing of contact information and uses the term recipient as a user who receives the contact information, though these titles are used for description purposes only.

Throughout this description, the initiator provides access to the initiator's contact record to the recipient, though it is anticipated that the recipient will then reciprocate and provide access to the recipient's contact record to the initiator, though not required. Note that in some examples throughout this description, it is cited that the recipient receives access to the initiator's contact record. This is fully anticipated to be any subset of the initiator's contact record or the entire initiator's contact record, even though not explicitly stated.

Throughout this description, an initiator device is a device used by the initiator and a recipient device is a device used by the recipient. Although any device is anticipated (e.g. personal computer, tablet, smartwatch), a smartphone 10 is used as an exemplary initiator device and an exemplary recipient device.

Referring to FIG. 1 illustrates a data connection diagram of the exemplary system for common contact management. In this example, one or more devices such as smartphones 10 communicate through the cellular network 68 and/or through a wide area network 506 (e.g. the Internet) to a server computer 500.

Figure 13:
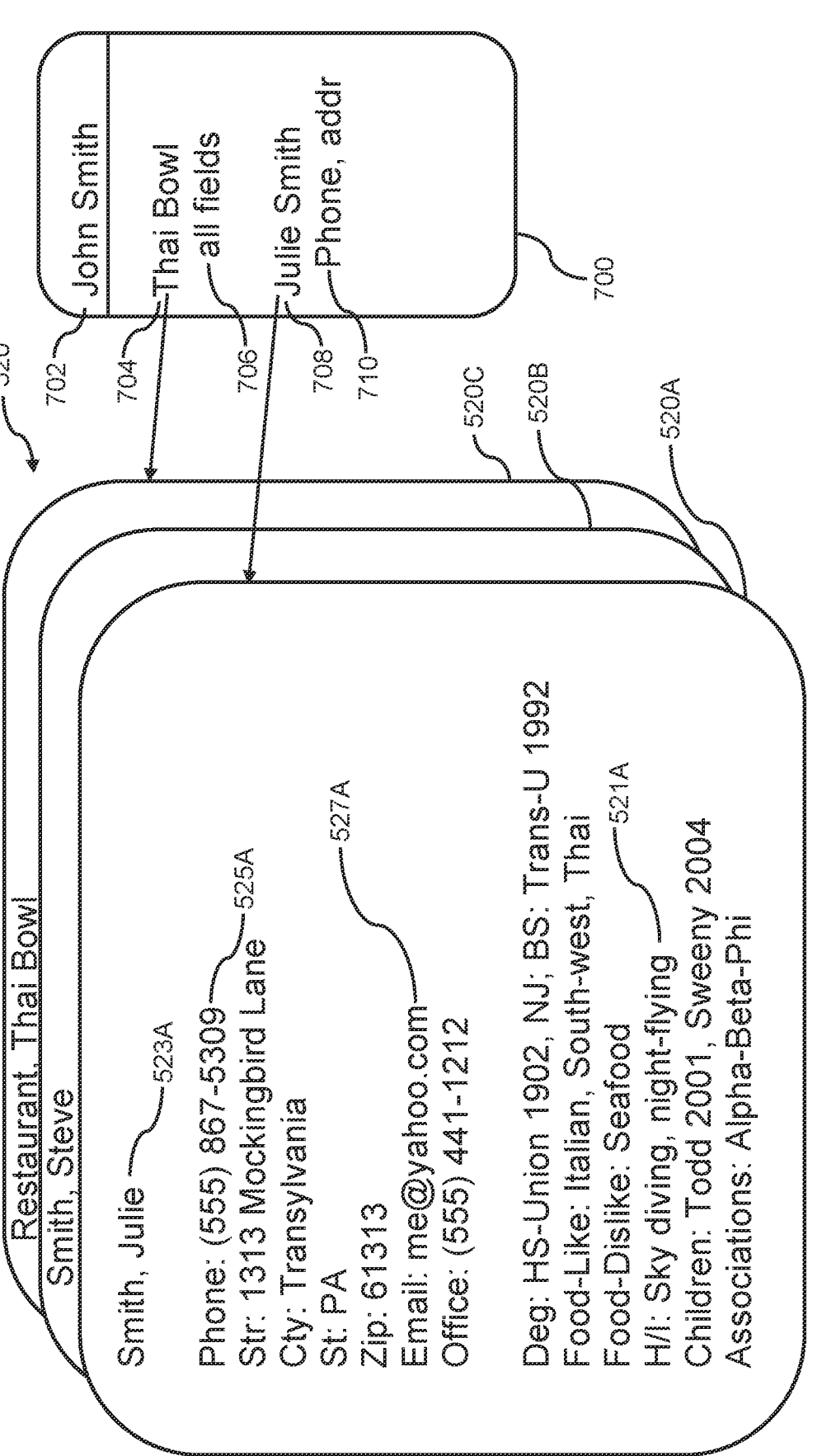
FIGS. 13, 13A and 13B illustrate exemplary sets of contact records of the system for common contact management.

The server computer 500 has access to data storage 502 (e.g. "cloud" storage) that is used to store contact records 520 (see FIG. 13). Although one path between the smartphones 10 and the server 500 is shown going through the cellular network 68 and the wide area network 506 as shown, any known data path is anticipated. For example, the Wi-Fi transceiver 96 (see FIG. 2) of the smartphone 10 is used to communicate directly with the wide area network 506, which includes the Internet, and, consequently, with the server computer 500.

The server computer 500 transacts with software running on the smartphones 10 through the network(s) 68/506. The software (e.g., an application) presents menus to/on the smartphones 10, provides data to the smartphones 10, and communicates information to/from the server such as new contact records 520.

The server computer 500 transacts with an application running on the smartphones 10 as needed, for example, when downloading a new contact (contact record 520—see FIG. 13) or updating an existing contact record 520. In some areas, smartphone access is sporadic and, being such, the application running on the smartphone downloads and caches a subset of contact records 520.

In some embodiments, when the phonebook application runs on the smartphone 10, the geographic area of the smartphone 10 is determined by reading the GPS subsystem 91 (see FIG. 2) of the smartphone 10 or by triangulation with several cellular towers. In some embodiments, the location (e.g. from the GPS subsystem 91) is used to enhance the usability of the smartphone 10. For example, when at home, different contact records 520 are highlighted/presented than when at work, etc. In some embodiments, when location services are available, direct and indirect connections are identified.

In FIG. 1, an exemplary data connection diagram of the system for common contact management is shown. The system for common contact management, for example, includes a server 500 that transacts with one or more end user devices (e.g. smartphones 10) to manage contact records 520.

The system for common contact management stores contact records 520 (see FIGS. 13, 13A, 13B) in a contact records database 552 (e.g. in a disk 502 that is local to the server 500, cloud-based storage, etc.). In this example, contact records 520 or partial contact records 520 are communicated between the server 500 and end-user devices (e.g. smartphones 10) through a network 68/506. Any network topology and composition are fully anticipated including only a data network 508 (e.g. the Internet) or only the cellular network 68 (e.g. sending transactions and contact records using Short Message Services—SMS). Each end-user device (e.g. smartphone 10) has access, and as anticipated, has a copy of its own contact record 520. In some embodiments, two or more user devices are enabled to communicate by way of a local communications path, for example a Bluetooth or Wi-Fi connection between two or more end-user devices such as smartphones 10.

Figure 2:
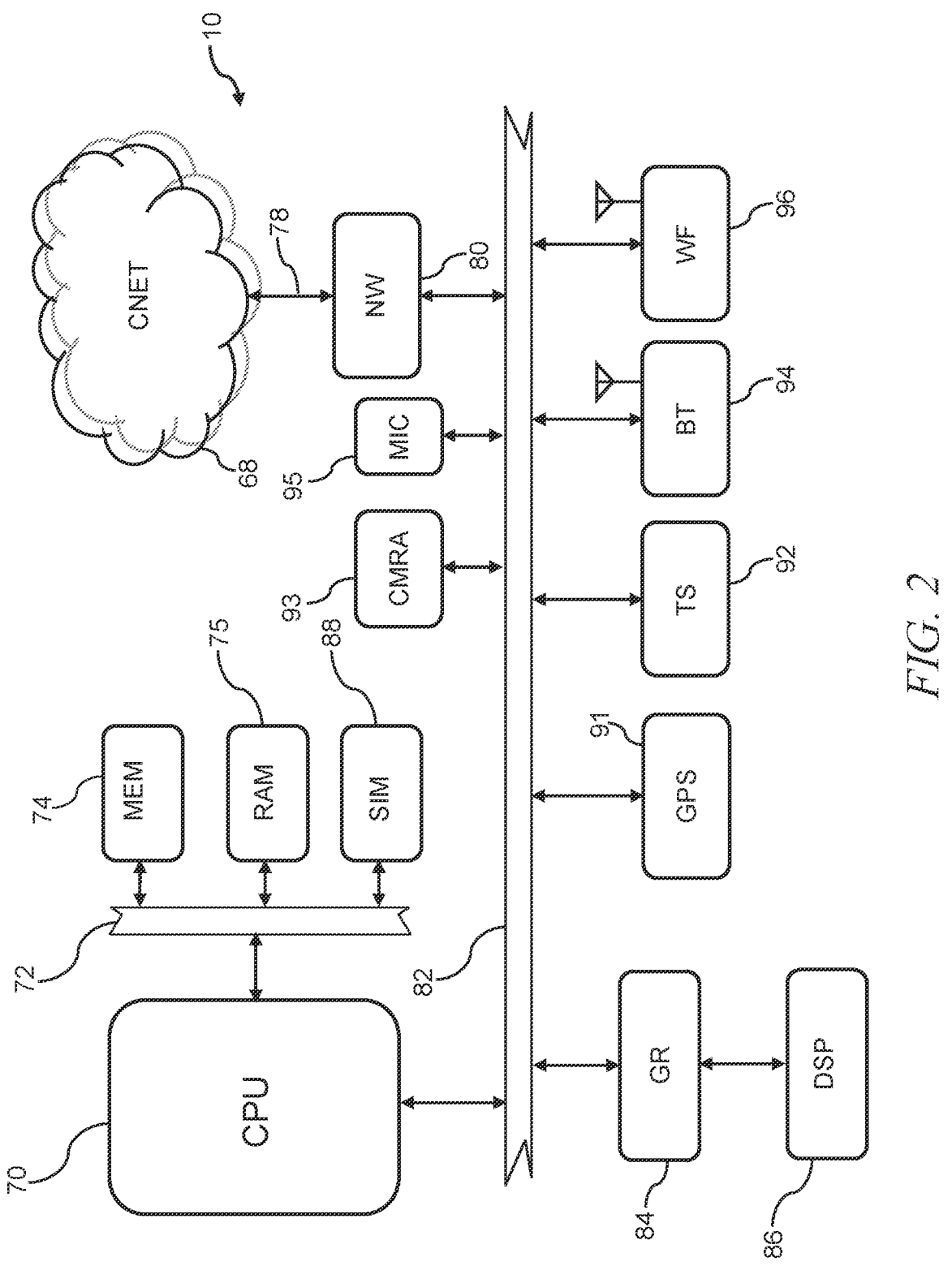
FIG. 2 illustrates a schematic view of a typical smartphone.

Referring to FIG. 2, a schematic view of a typical end-user device, a smartphone 10 is shown. Although any end-user device is anticipated, for clarity purposes, a smartphone 10 will be used in the remainder of the description.

The system for common contact management is described using a processor-based end-user device (e.g., smartphone 10) for providing the login and user interfaces necessary for managing contact information and using a phonebook having access to contact records 520, for example, to place a call. The present invention is in no way limited to using a smartphone 10 and any similar device is anticipated (e.g., cellular phone, portable digital assistant, tablet, notebook, etc.).

The example smartphone 10 represents a typical device used for accessing user interfaces of the system for common contact management. This exemplary smartphone 10 is shown in its simplest form. Different architectures are known that accomplish similar results in a similar fashion and the present invention is not limited in any way to any particular smartphone 10 system architecture or implementation. In this exemplary smartphone 10, a processor 70 executes or runs programs in a random-access memory 75. The programs are generally stored within a persistent memory 74 and loaded into the random-access memory 75 when needed. Also accessible by the processor 70 is a SIM card 88 (subscriber information module) having a subscriber identification and often persistent storage. The processor 70 is any processor, typically a processor designed for phones. The persistent memory 74, random access memory 75, and SIM card are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary smartphones 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the SIM card 88 is used to store programs, executable code, cached contact records 520, and data, etc. In some embodiments, other data is stored in the persistent memory 74 such as audio files, video files, text messages, etc.

The peripherals are examples and other devices are known in the industry such as Global Positioning Subsystem 91, speakers, microphones, USB interfaces, camera 93, microphone 95, Bluetooth transceiver 94, Wi-Fi transceiver 96, image sensors, temperature sensors, etc., the details of which are not shown for brevity and clarity reasons.

The cellular network interface 80 connects the smartphone 10 to the cellular network 68 through any cellular band and cellular protocol such as GSM, TDMA, LTE, 5G, etc., through a wireless medium 78. There is no limitation on the type of cellular connection used. The cellular network interface 80 provides voice call, data, and messaging services to the smartphone 10 through the cellular network 68.

For local communications, many smartphones 10 include a Bluetooth transceiver 94, a Wi-Fi transceiver 96, near-field transceivers, or any combination of such. Such features of smartphones 10 provide data communications between smartphones 10 and data access points and/or other computers such as a personal computer (not shown).

Figure 3:
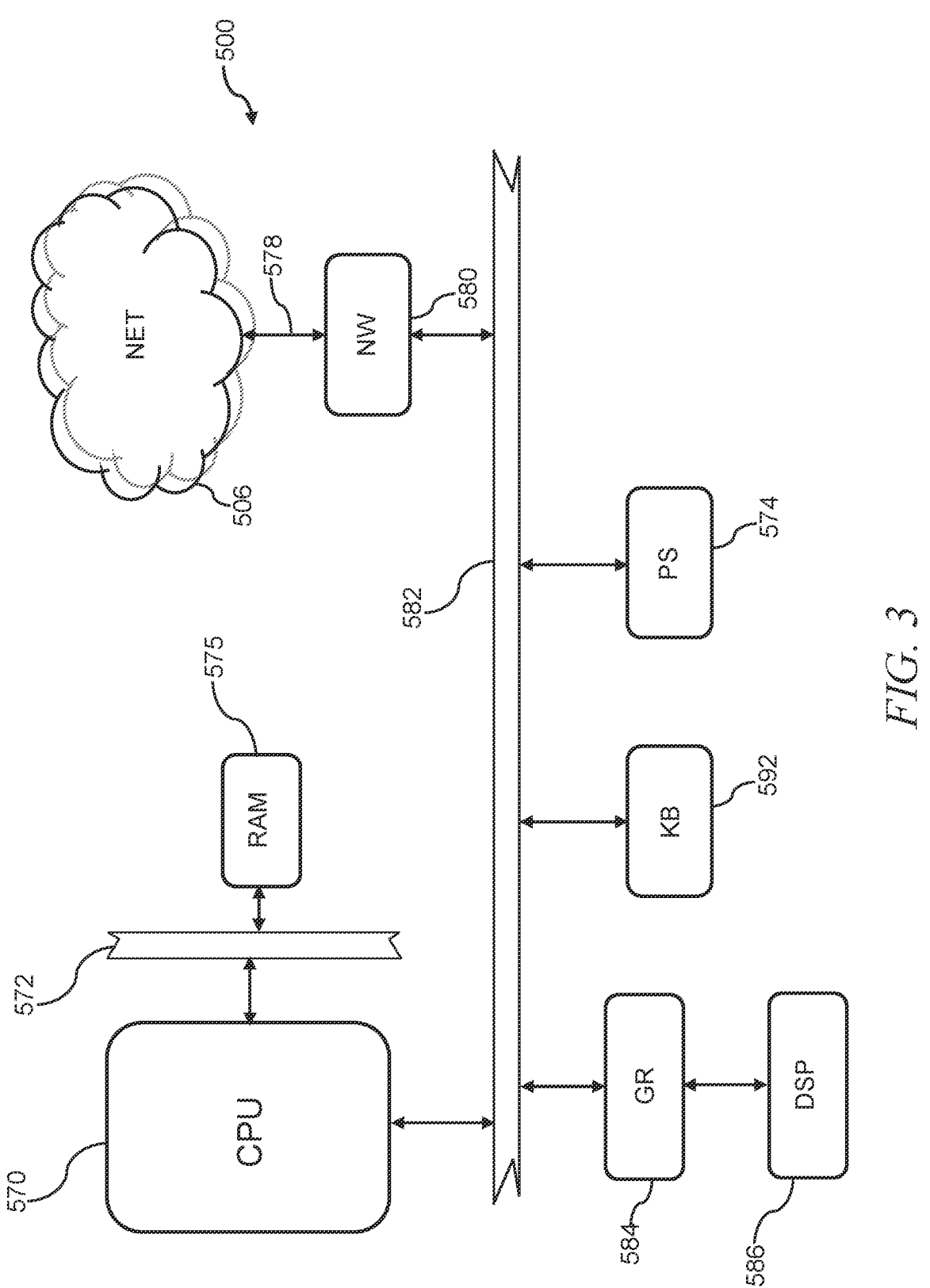
FIG. 3 illustrates a schematic view of a typical computer system such as a server or personal computer.

Referring to FIG. 3, a schematic view of a typical computer system (e.g., server 500) is shown. The example computer system 500 represents a typical computer system used for back-end processing, generating reports, displaying data, etc. This exemplary computer system is shown in its simplest form. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 (e.g., disk storage) is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, contact records 520, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Figure 4:
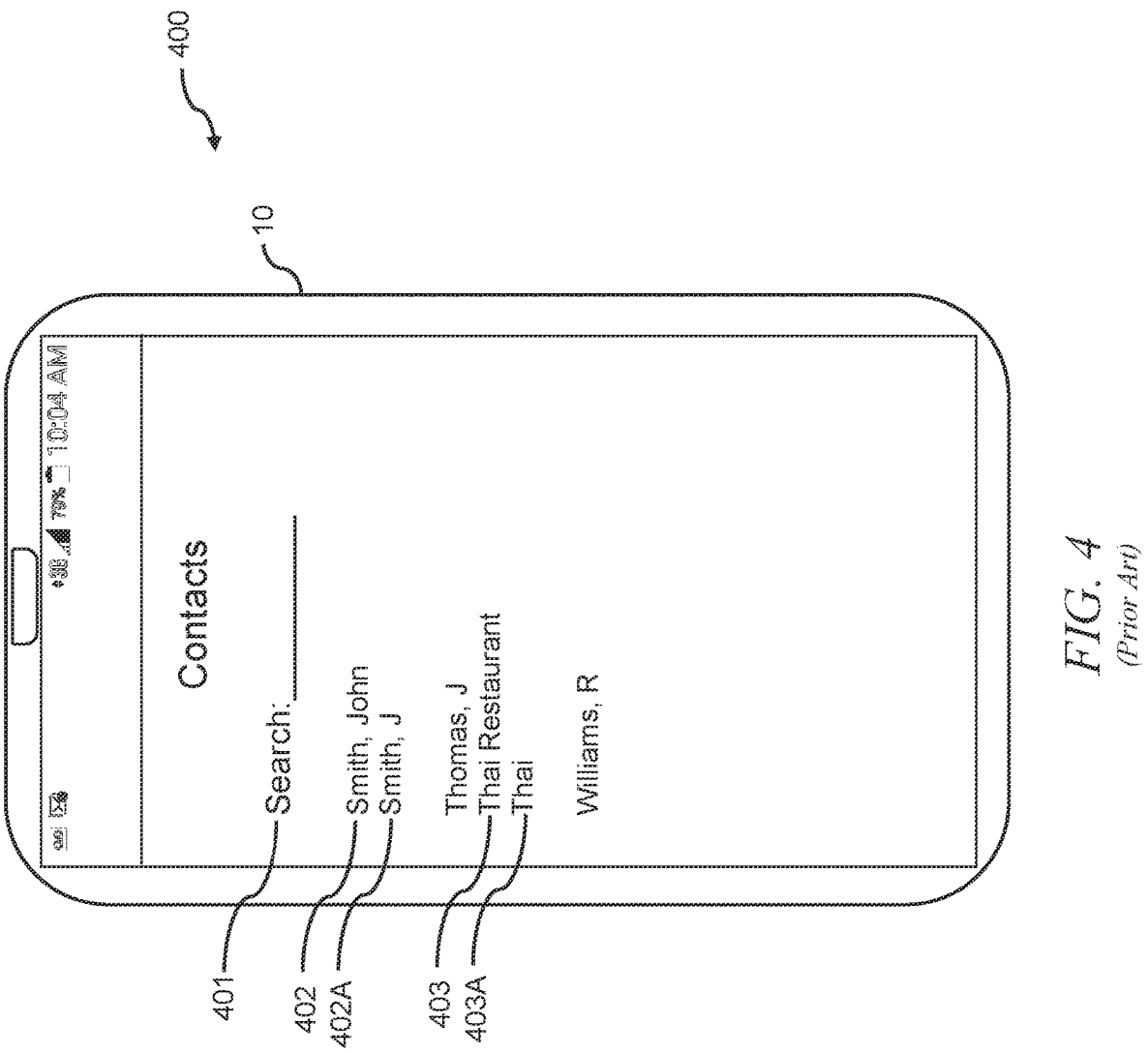
FIG. 4 illustrates a smartphone user interface of the prior art.

Referring to FIGS. 4, a typical phonebook interface 400 of the prior art is shown. As with many such interfaces, the phonebook interface 400 of the prior art includes a search feature 401 which is especially useful when the phonebook has many records. In the prior art, many phonebook records were entered manually. As a result, this user interface shows some redundant records such as records for John Smith 402 and J. Smith 402A and records for a Thai Restaurant 403 and simply "Thai" 403A, among other records. As a user creates new phonebook records in the phonebook interface 400 of the prior art, there is no checking to see if a record already exists and, therefore, both of the above pairs or records 402/402A/403/403A likely represent only two entities, John Smith and a Thai Restaurant. Since the phonebook of the prior art is organized and keyed by the name of the person/establishment, there can be many entries having the same phone number. For example, the record for John Smith 402 and J smith 402A likely have the same phone number.

Referring to FIGS. 5-12A, exemplary user interfaces of the system for common contact management are shown. Although many user interfaces are anticipated, one set of examples are shown for brevity reasons. Some of the user interfaces utilize a browser running on the user device (e.g., a computer as shown in FIG. 3), while some of the examples shown are generated/managed by an application that runs on the user device (e.g. smartphone 10). Again, for brevity, in the remainder of the description, the user device will be referenced as a smartphone 10.

Figure 5:
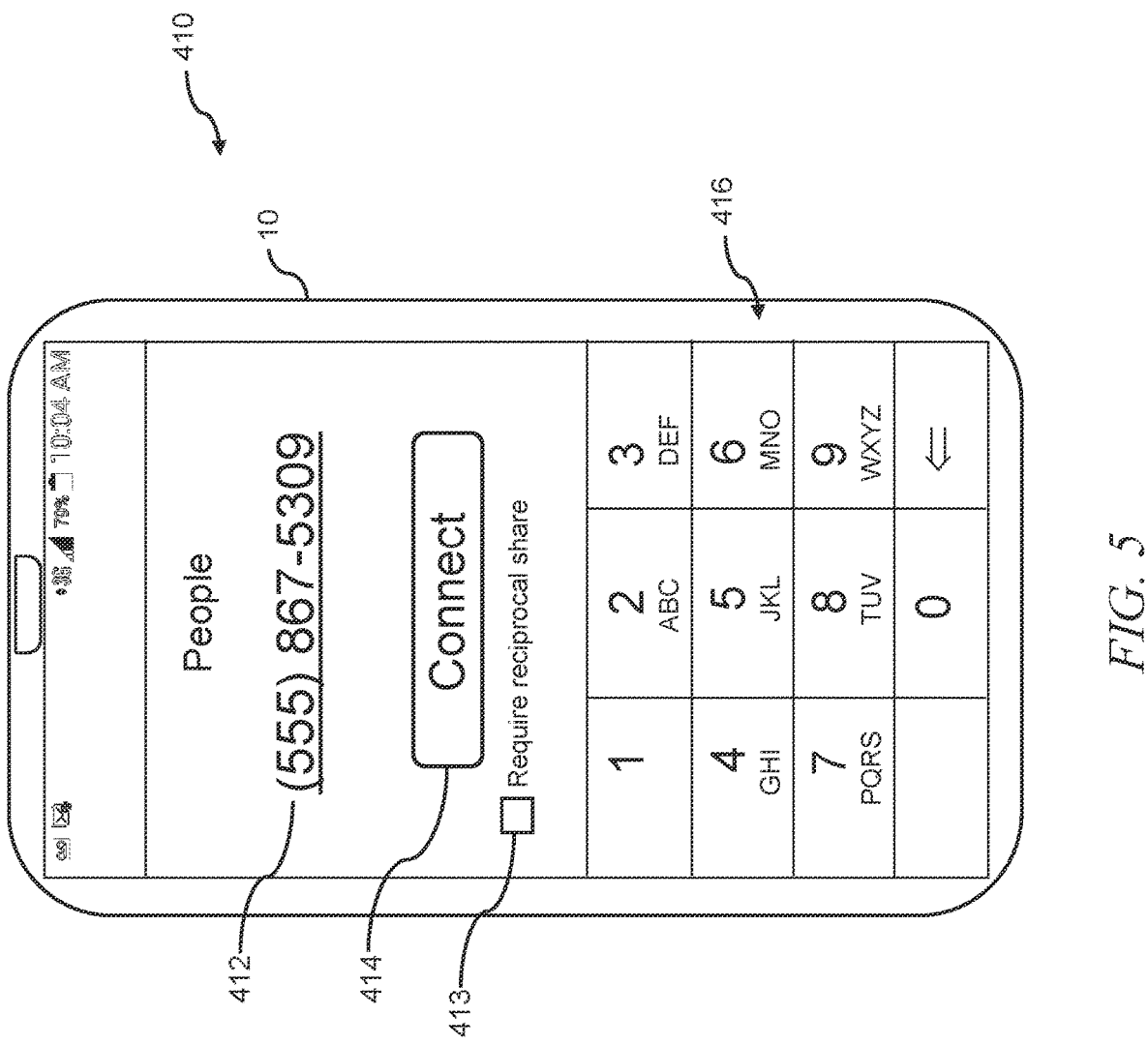
FIGS. 5, 5A and 5B illustrate exemplary smartphone user interfaces for initiating contact between two users in the system for common contact management.
Figure 5A:
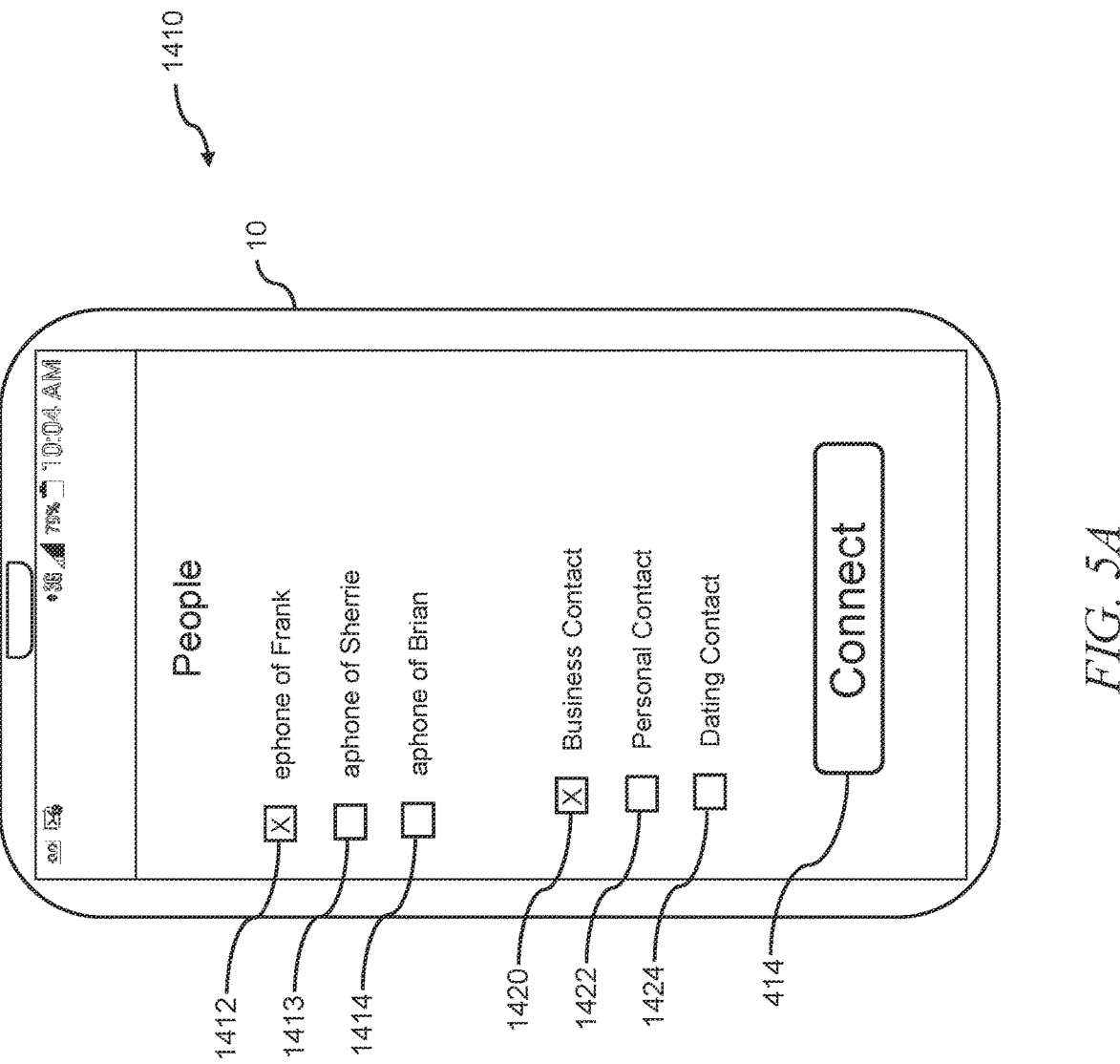
Figure 5B:
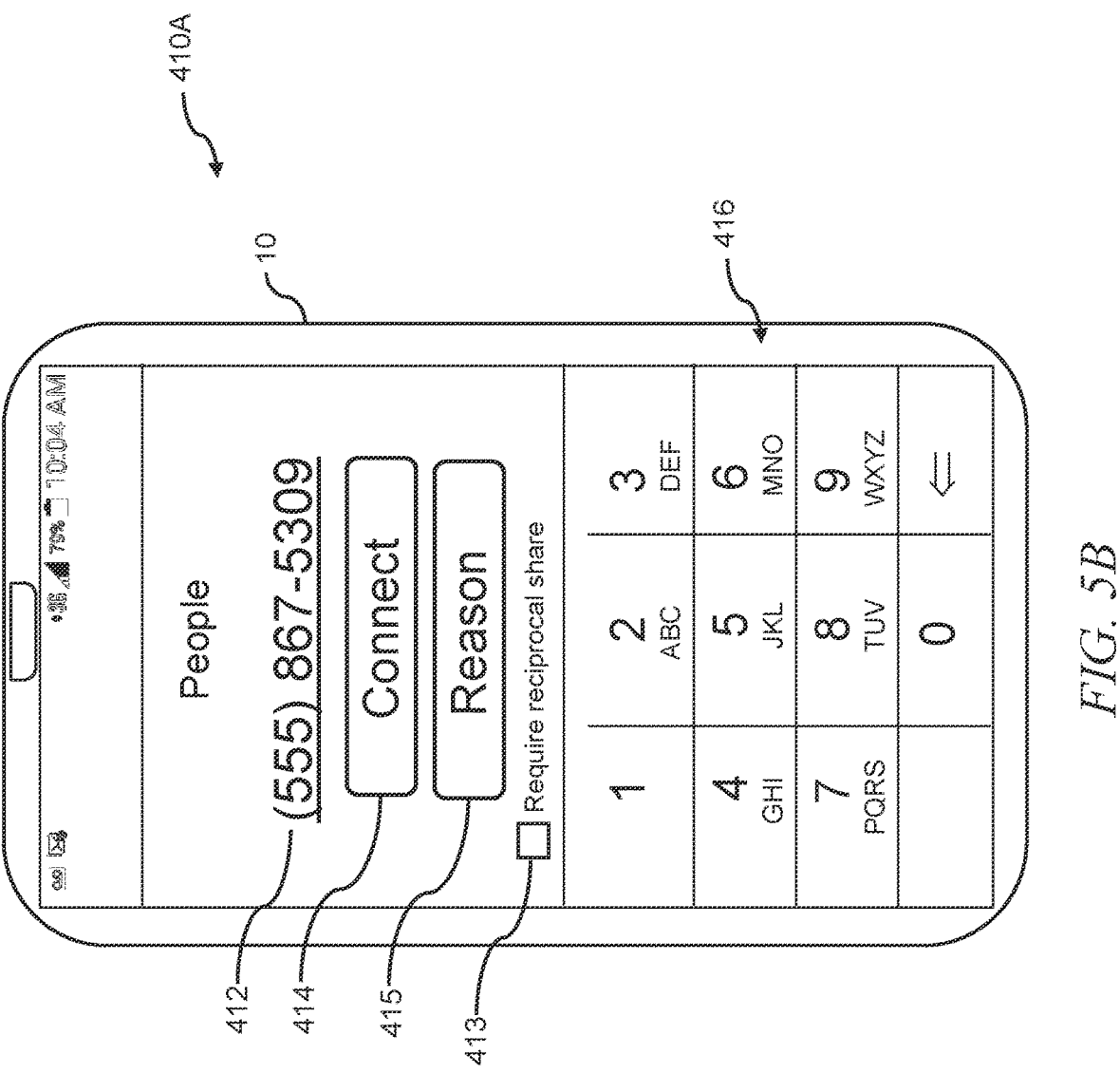

When an initiator desires to share contact information with a recipient, the initiator (having already configured and downloaded the contact management application) initiates the contact management application and navigates to a request user interface 410 or 1410 as shown in FIGS. 5, 5A, and 5B. In the request user interface 410 of FIG. 5, the initiator has entered (inputted) the phone number 412 of the recipient using, for example, an on-screen numeric keypad 416, a keyboard, voice input, etc. In FIG. 5A, the initiator's device has found a local connection 1412 (e.g. by way of Bluetooth or WIFI) to the recipient's device as well as other local connections 1413/1414 to other nearby devices and has selected the local connection 1412 to the recipient's device. Note that in this embodiment, after selecting the local connection 1412 to the recipient's device, the initiator selects the reason for connecting 1420/1422/1424 (e.g., connect for business reasons 1420, connect for personal reasons 1422, connect for dating 1424). Note that the reasons for connecting 1420/1422/1424 that are shown are for example reasons as more or less reasons are fully anticipated. Such reasons for connecting 1420/1422/1424 define a relationship between the initiator and the recipient. In this embodiment, the contact management application is running on both the initiator's device and the recipient's device, and the initiator's device has or has access to the initiator's contact record 520. Therefore, in this embodiment, upon selecting the connect feature 414, the contact management application running on the initiator's device sends selected fields (based upon the relationship) from the initiator's contact record 520 to the contact management application running on the recipient's device 1412 where, if accepted, the selected fields the initiator's contact record 520 are saved in a contact list/database of the recipient's device 1412. Note that the contact list/database is either that of the contact management application of a native contact application that is typically provided by the provider of the recipient's device 1412. In some such embodiments, after the contact is accepted by the recipient, a transaction is also sent to the server 500 to record the sharing of contact information and the relationship for future updates as will be described.

In FIG. 5B, the user interface 410A includes a reason field 415 that is either free form or a selection of reasons (e.g., connect for business reasons, connect for personal reasons, connect for dating). Once the phone number 412 is entered (and optionally the reason field 415), the initiator invokes the connect feature 414. In some embodiments, this sets a restriction on the fields of the contact record that will be available to the recipient device and, hence to the recipient.

In some embodiments, a flag or field for reciprocal sharing 413 is provided. Reciprocal sharing means that the recipient will not receive the initiator's contact information until the recipient shares his or her own contact information with the initiator. In such, the recipient receives the request to connect as in FIG. 6B, but does not have the option to accept using the accept directive 424—the recipient must accept using the accept/share directive 425. In some embodiments the initiator has user interface features that set minimum share-back requirements when reciprocal sharing is used. For example, requiring the recipient to share at least the recipient's phone number and email address.

If the recipient has not previously loaded the contact management application on their smartphone 10, the recipient receives a text message including a link to download the contact management application along with text indicating the name of the initiator that wants to connect to them and in some embodiments, other information regarding the initiator.

Figure 6:
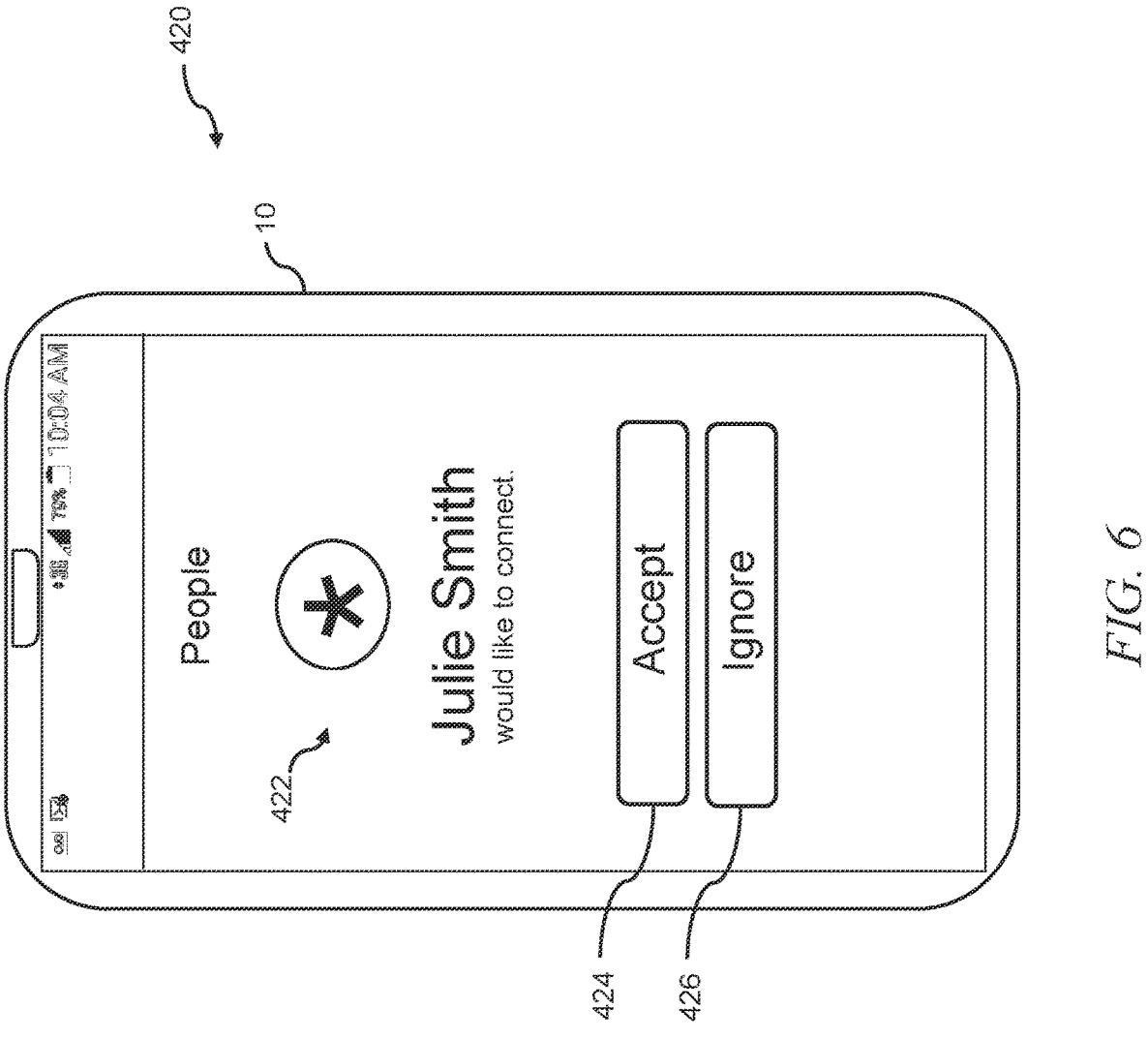
FIGS. 6, 6A, and 6B illustrate exemplary user interface for accepting a contact in the system for common contact management.
Figure 6A:
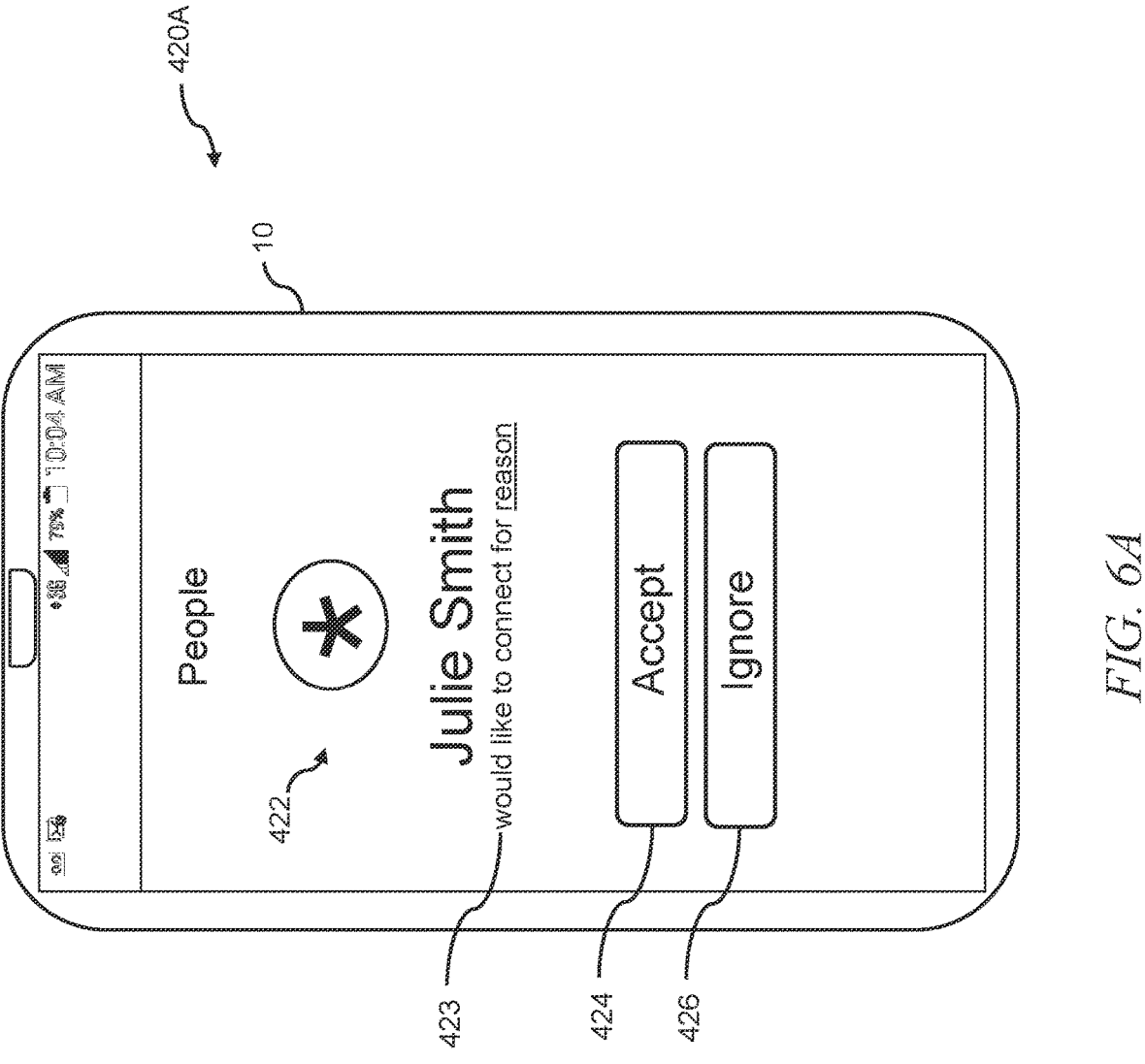
Figure 6B:
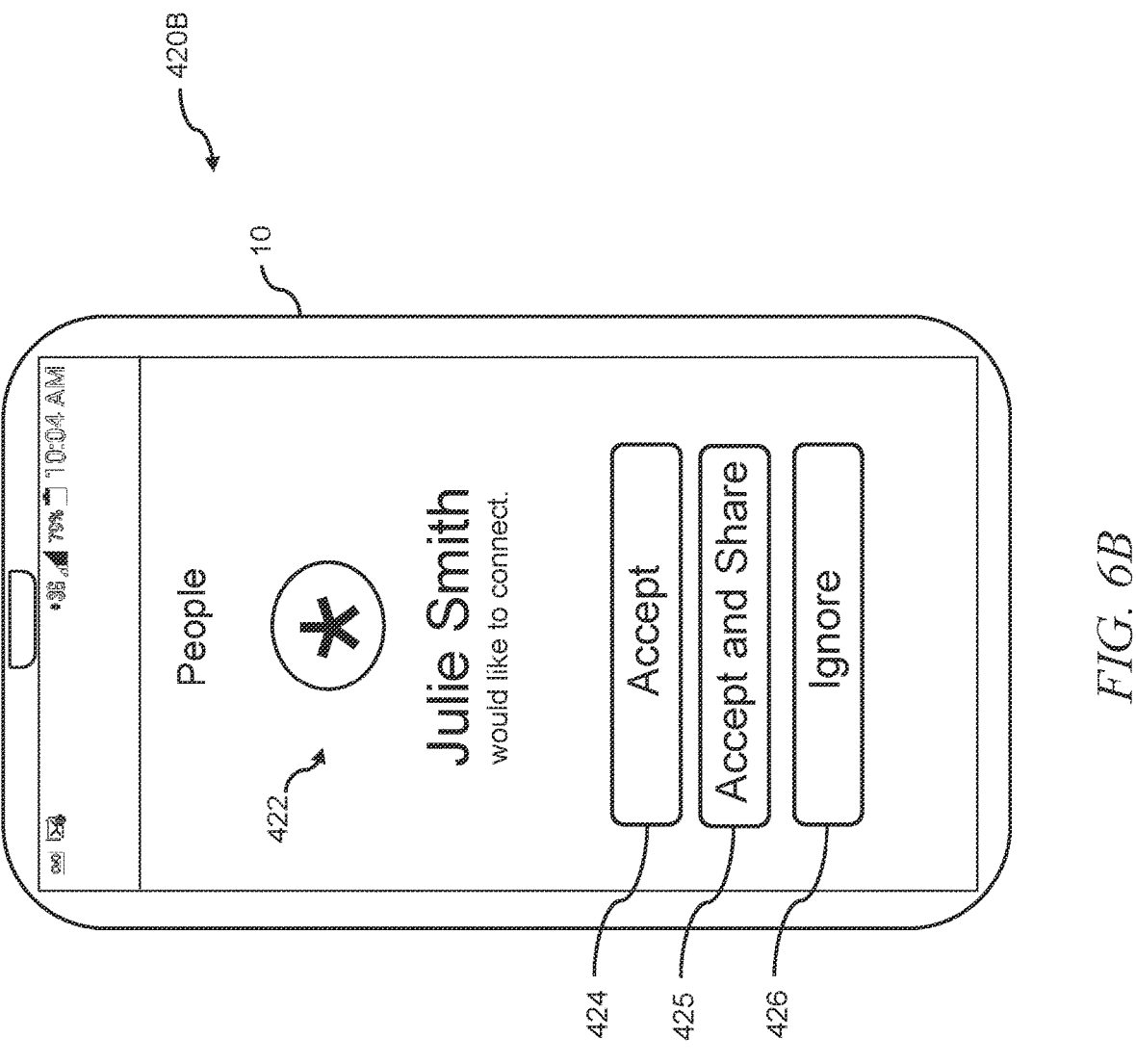

If the recipient had previously loaded the contact management application or after the loading is complete, the recipient is presented a query user interface 420/420A/420C as shown in FIGS. 6, 6A, and 6B.

In FIGS. 6 and 6A, exemplary accept user interfaces 420/420A are shown. A description of the person 422 desiring to connect is displayed (e.g., the first person's name, picture, phone number, etc.) and options to accept the connection 424 or ignore the request 426. In FIG. 6A, the accept user interface 420A includes a reason 423 that the initiator wishes to connect, which is useful in examples such as when the recipient does not know or has not met the initiator. In some embodiments, if the recipient selects accept the connection 424, the recipient receives access to at least a portion of the initiator's contact record 520 from the storage 502. In some embodiments, if the recipient selects accept the connection 424, the recipient receives access to at least a portion of the initiator's contact record 520 from the storage 502 in exchange for sharing the recipients contact record 520 with the initiator.

In FIG. 6B, the exemplary accept user interface 420B is shown. This accept user interface 420B is similar to those previously described, having the description of the person 422 desiring to connect is displayed (e.g., the first person's name, picture, phone number, etc.) and options to accept the connection 424 or ignore the request 426. As with the accept user interface 420A of FIG. 5A, in some embodiments the accept user interface 420B also includes a reason 423 that the initiator wishes to connect. If the recipient selects accept the connection 424, the recipient receives access to at least a portion of the initiator's contact record 520 from the storage 502. In this accept user interface 420B, an additional feature is provided as an accept/share directive 425. By invoking the accept/share directive 425, the recipient is providing their own contact information (or subset thereof) back to the initiator. It is fully anticipated that the accept/share directive 425 will provide either a default set of contact information that is to be shared with the initiator. In some embodiments, the recipient is provided with user interfaces 430/460 as in FIGS. 8 and 10 for selecting what sections/items of the initiator's contact is to be shared with the initiator.

As with the initiator sharing contact information with the recipient, the recipient has the ability to later restrict, limit, or inhibit any or all access of the recipient's contact record to the initiator.

Note that the request user interface 410 interface is simplified for clarity reasons as when the initiator invites the recipient, the initiator typically has selection criteria (as will be discussed) to limit/restrict which portions (fields) of the initiator's contact record 520 is accessible by the recipient (e.g. only phone number, name, and address, not personal information, work information, etc.). Likewise, in the accept user interface 420, it is anticipated that there will be directives to provide the recipient's contact record 520 along with directives to limit/restrict which portions (fields) of the recipient's contact record 520 is accessible to the initiator (e.g. only phone number, name, and address, personal information, work information, etc.).

Figure 7:
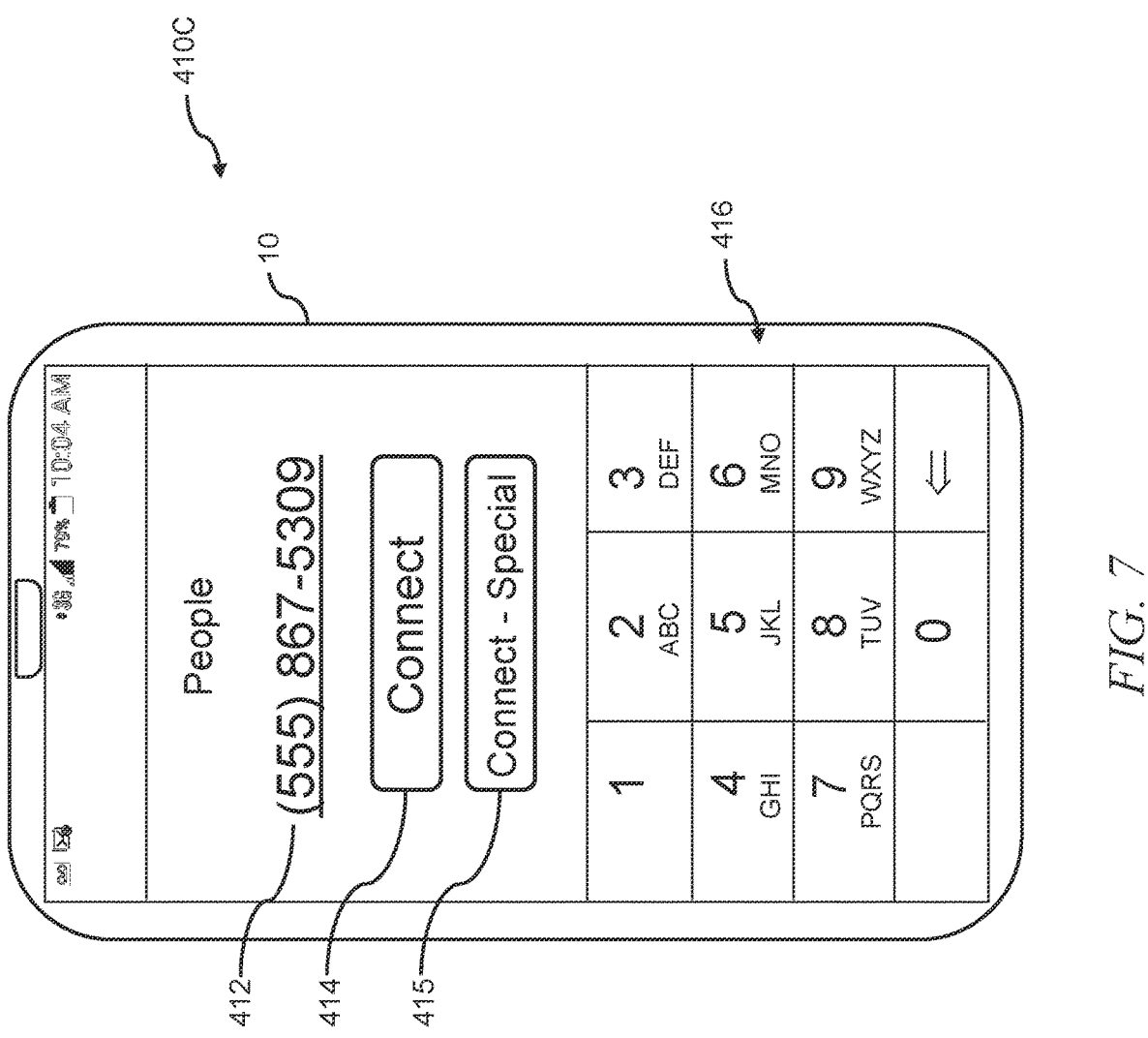
FIG. 7 illustrates another exemplary user interface initiating contact between two users the system for common contact management.

In FIG. 7, a slightly different request user interface 410C is shown. In this request user interface 410C of FIG. 7, the initiator has entered the phone number 412 of the recipient using, for example, an on-screen numeric keypad 416. Once the phone number 412 is entered, the initiator invokes either the connect feature 414 (taking the default permissions) or the connect-special feature 415, allowing the initiator to select what sections of the initiator's contact is to be shared with the recipient.

Figure 8:
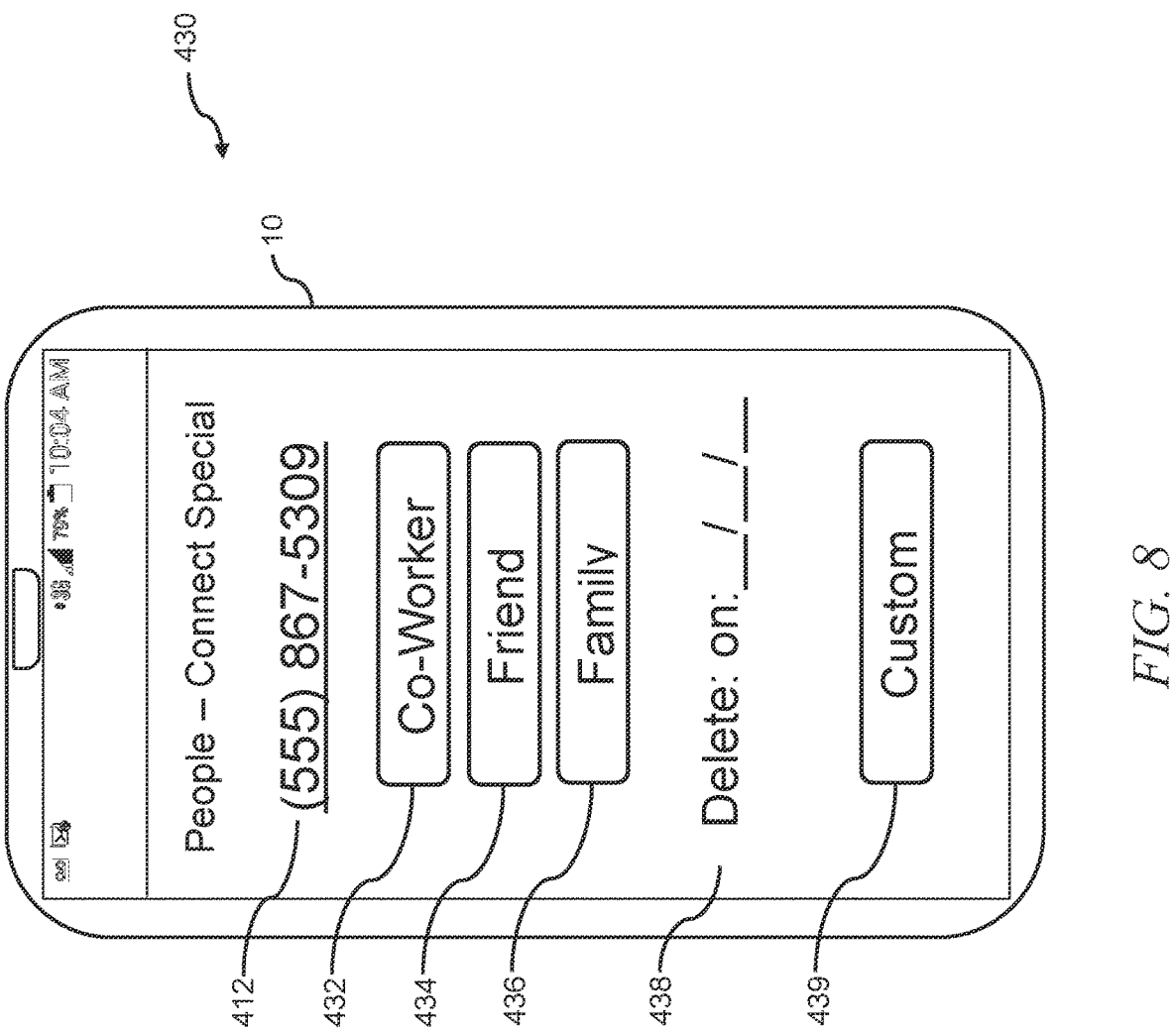
FIG. 8 illustrates an exemplary user interface for initiating contact between two users of the system for common contact management.

Upon invoking the connect-special feature 415, the connect-special user interface 430 as shown in FIG. 8 is presented, carrying forward the recipient's phone number 412. In the connect-special user interface 430, the initiator has selections to provide contact data to a co-worker 432, to a friend 434, or to a family member 436. For example, the contact data provided to a co-worker only contains work phone number and office location while the contact data provided to a family member contains phone number, cellular number, address, date-of-birth, etc.

As will be shown, the initiator can revoke the recipient's access to any contact information that has been provided at any time. In addition, the initiator has the ability to change what information if provided to the recipient at any time (e.g., upgrade/downgrade relationship). In certain security/privacy scenarios, the initiator is able to set a date (or date/time) 438 for the deletion of the contact data that is accessible by the recipient. The date 438 is when the recipient will lose access to whatever contact data is provided or, in some embodiments, whatever additional contact information is provided.

Figure 9:
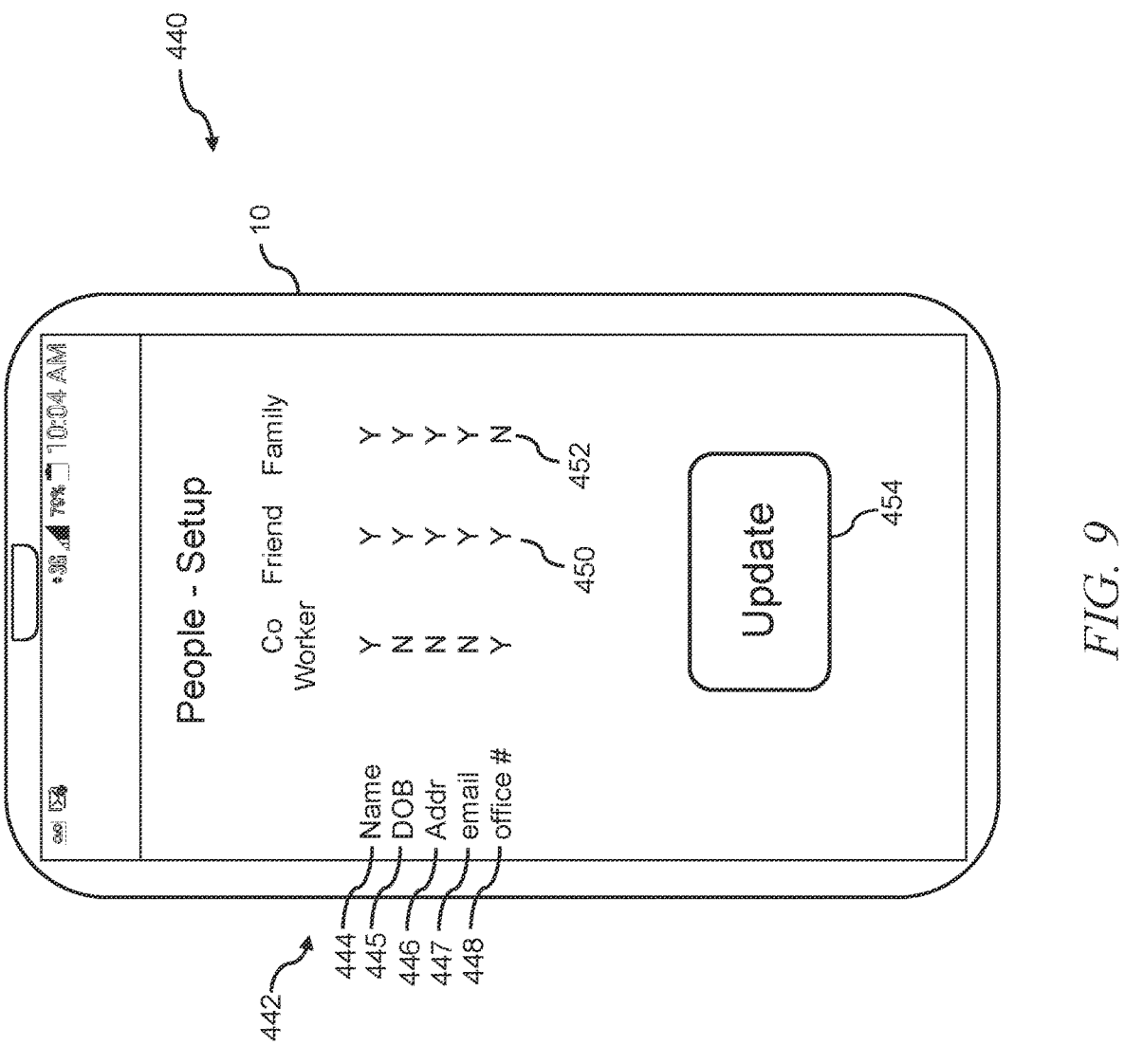
FIG. 9 illustrates an exemplary user interface initiating contact between two users of the system for common contact management.

It is fully anticipated that the initiator has capabilities to adjust settings controlling what contact data is provided under each of the co-worker 432, friend 434, and family member 436 directives. For example, some users will provide their cellular number to coworkers. This customization is made, for example, with a set-up user interface 440 as shown in FIG. 9. In this, the initiator is presented with a detailed list 462 of contact data and, for example, the "Yes" directives 450 and "No" directives 452 for each of the detailed list 462. The detailed list 462 shown in this example is shortened to five categories of contact data for clarity reasons: name 444, date-of-birth 445, address 446, email 447, and office phone number 448. For each of the desired categories, selections are made as to whether that desired category is to be included in the categories (co-worker 432, friend 434, family member 436). For example, a Yes directive 450 in the intersection of allergies 448 and the friend column indicates that when contact data is shared with a friend, allergy data is included. A No directive 452 in the intersection of allergies 448 and the family column indicates that when contact data is shared with a family, allergy data is excluded.

Although only three categories (co-worker 432, friend 434, family member 436) are shown, any number of categories is anticipated, including none. Other categories include, but are not limited to, clients, doctors, contractors, businesses, lawyers, etc. In some embodiments, the user has features for creating new categories or renaming existing categories. It is fully anticipated that user interfaces are presented showing contacts for selection and use (e.g., for sending email, for making phone calls, for social posting). In some embodiments, all contacts are shown in a single navigable list. In some embodiments, contacts are sorted by categories, labels, folders, groups, and are shown in individual lists for each category, etc.

In some embodiments, the initiator has the ability to rename or add directives suitable to their needs. This is performed using typical user interface operations of the smartphone 10, such as, overwriting the existing column headings.

Figure 10:
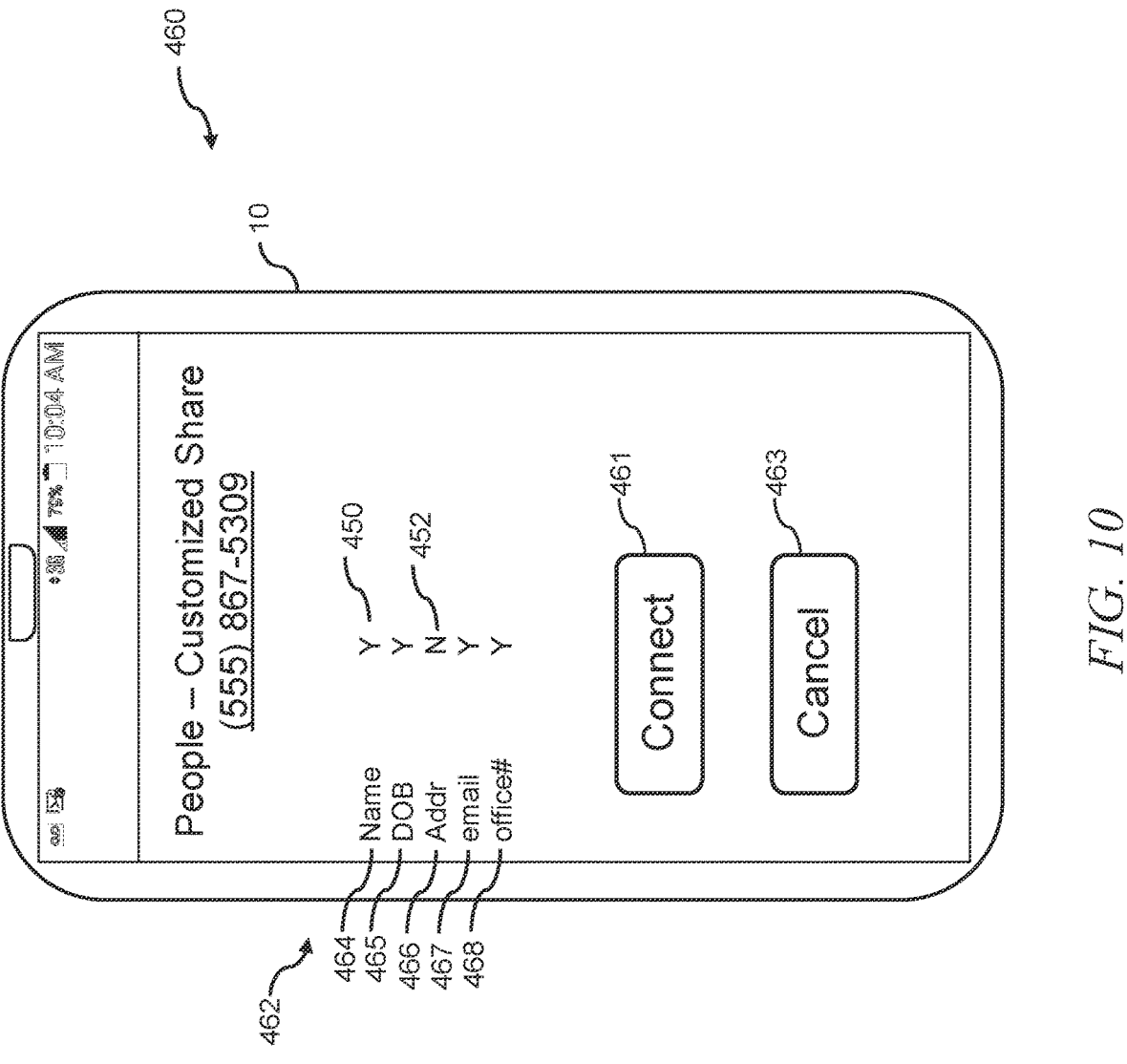
FIG. 10 illustrates an exemplary user interface initiating contact between two users of the system for common contact management.

For situations in which the initiator wishes to provide specific contact information to the recipient that does not fall into a pre-determined category (e.g., co-worker 432, friend 434, family member 436), the initiator selects the custom directive 439 and is presented with the custom contact share user interface 460 shown in FIG. 10.

In the custom contact share user interface 460, the initiator has a detailed list 462 of contact data and, for example, "Yes" directives 450 or "no" directive 452 for each of the detailed list 462. The detailed list 462 shown in this example is shortened to five categories of contact data for clarity reasons: name 464, date-of-birth 465, address 466, email 467, and office phone number 468. Once the desired categories are selected from the detailed list 462, the initiator selects the connect 461 to connect contact information with the recipient. The initiator has the ability to cancel with the cancel directive 463.

Figure 11:
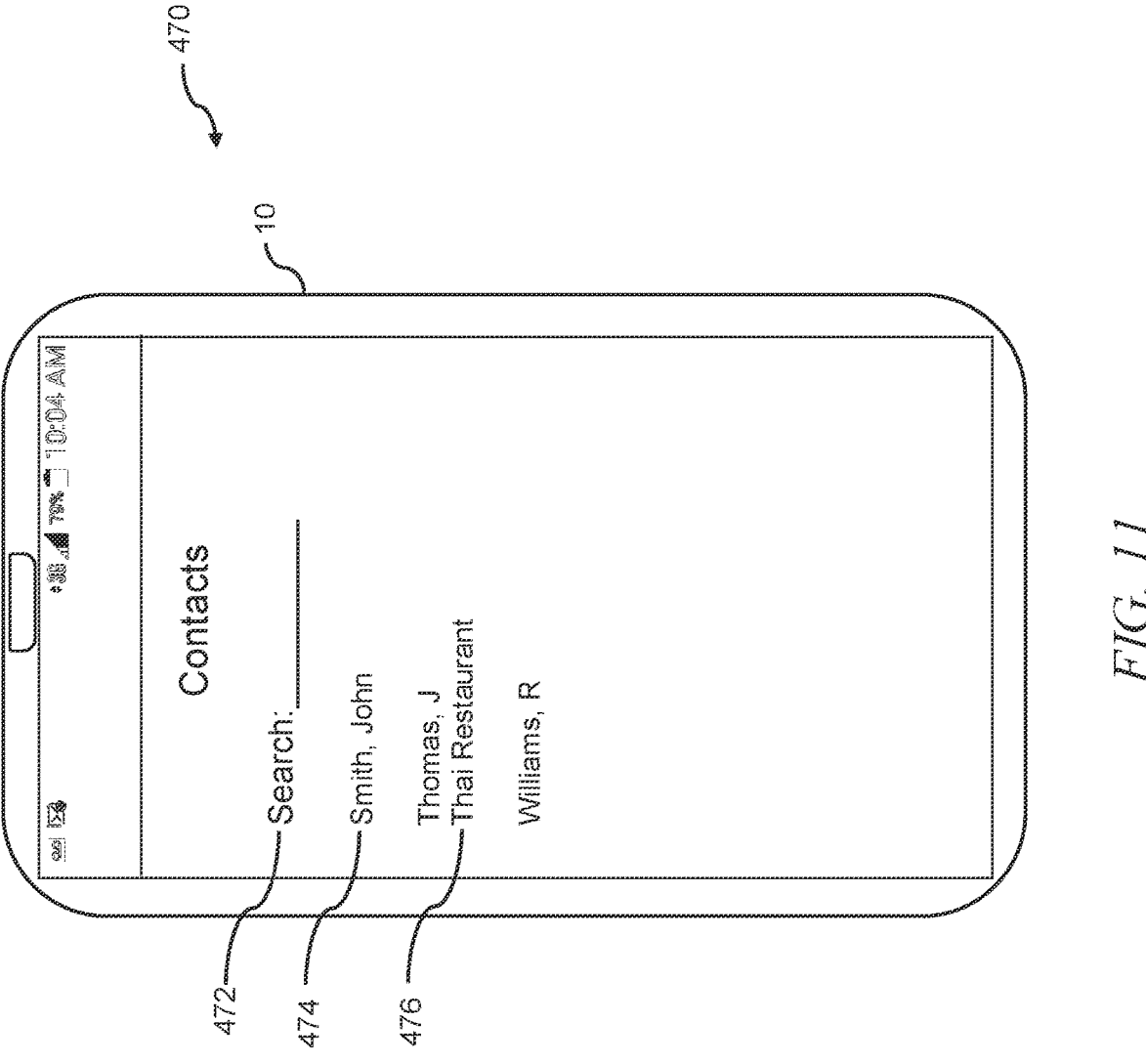
FIG. 11 illustrates an exemplary user interface for displaying/searching contacts using the system for common contact management.

Once the recipient accepts the contact data, the portion or all of the initiator's contact record 520 is entered into the phone contact management interface 470 as shown in FIG. 11. Note that in this example, there is only one entry for John Smith 474 and only one entry for the Thai Restaurant 476. Since there can be at most one entry per phone number, only one contact record 520 is allowed per phone number.

In some embodiments, the system for common contact management permits annotation of other's contact records. Annotation information is any data provided by the recipient of the contact record that is entered by the recipient and thereafter associated with the contact record but held privately for the recipient. By this, the annotation information is accessible only by the recipient, not by the initiator.

Figure 11A:
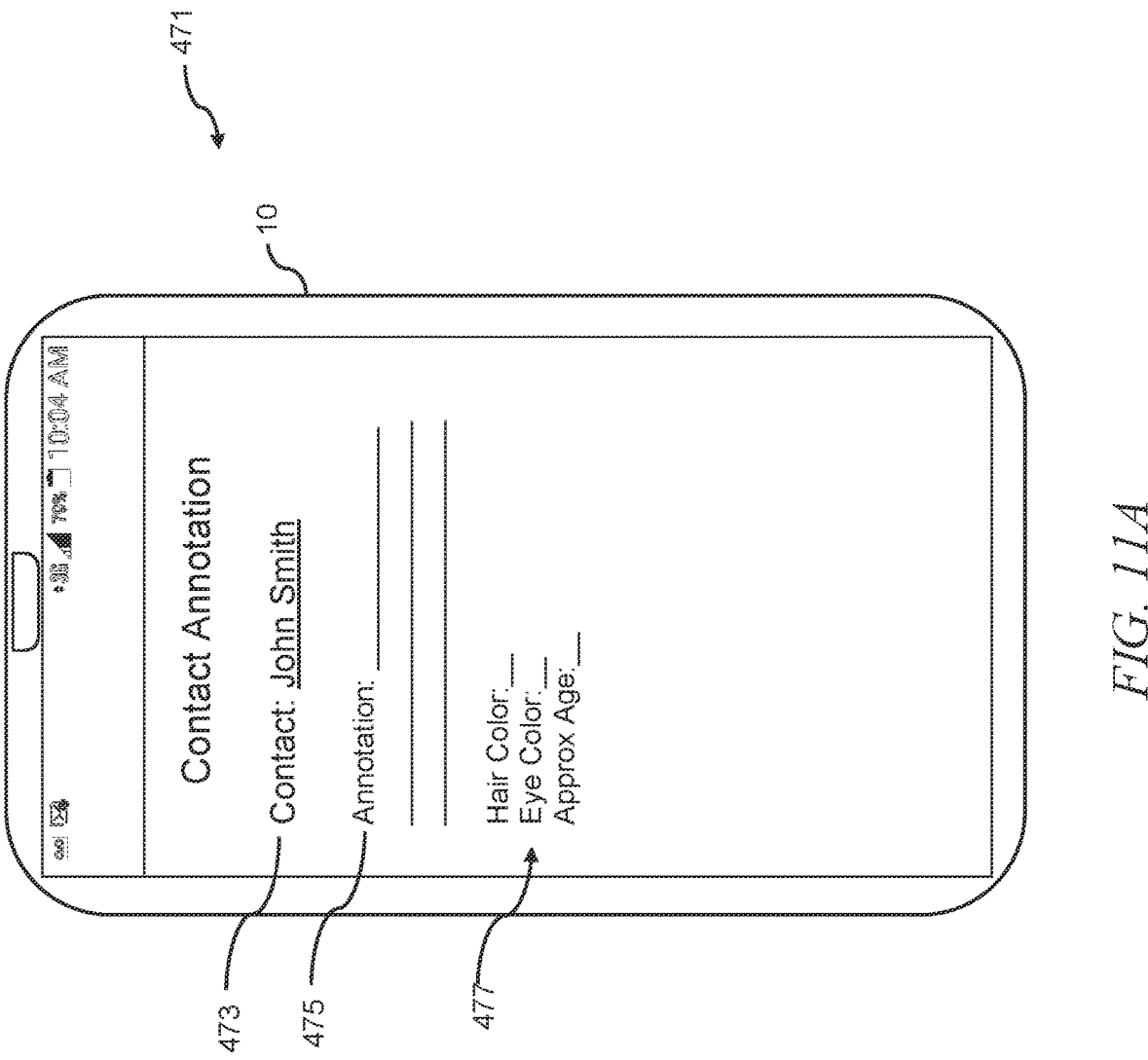
FIG. 11A illustrates an exemplary annotation user interface of the system for common contact management.

In the exemplary annotation user interface 471 of FIG. 11A, the user has selected a contact (John Smith), for example by tapping on the contact in the list of FIG. 11. The name 473 associated with the contact is displayed and, in some embodiments, other information is displayed that has been made available from the contact record of this user (e.g., phone number, address). The annotation user interface 471 enables a user to annotate the record for another individual, either using free-form annotation fields 475 or pre-determined annotation fields 477. The data entered in the free-form annotation fields 475 and/or pre-determined annotation fields 477 is uploaded to the server 500 and stored in the data storage 502. When the user accesses the system for common contact management, for example, on another device (e.g., on their desktop computer or tablet), the annotation data 475/477 is available and displayed for this contact (John Smith). In this way, the annotation data is distributed across all platforms used by this user. Further, the user has the ability to search the contact records by information in the annotation data 475/477. For example, if the user adds annotations for hair colors and eye colors to their annotation data 475/477 of others, then the user has the ability to search for all contacts having brown hair and brown eyes. Another example is to add a company name (AT&T, IBM, Dell . . . ) and the user has the ability to search for all contacts having an association with one of the companies.

Figure 11B:
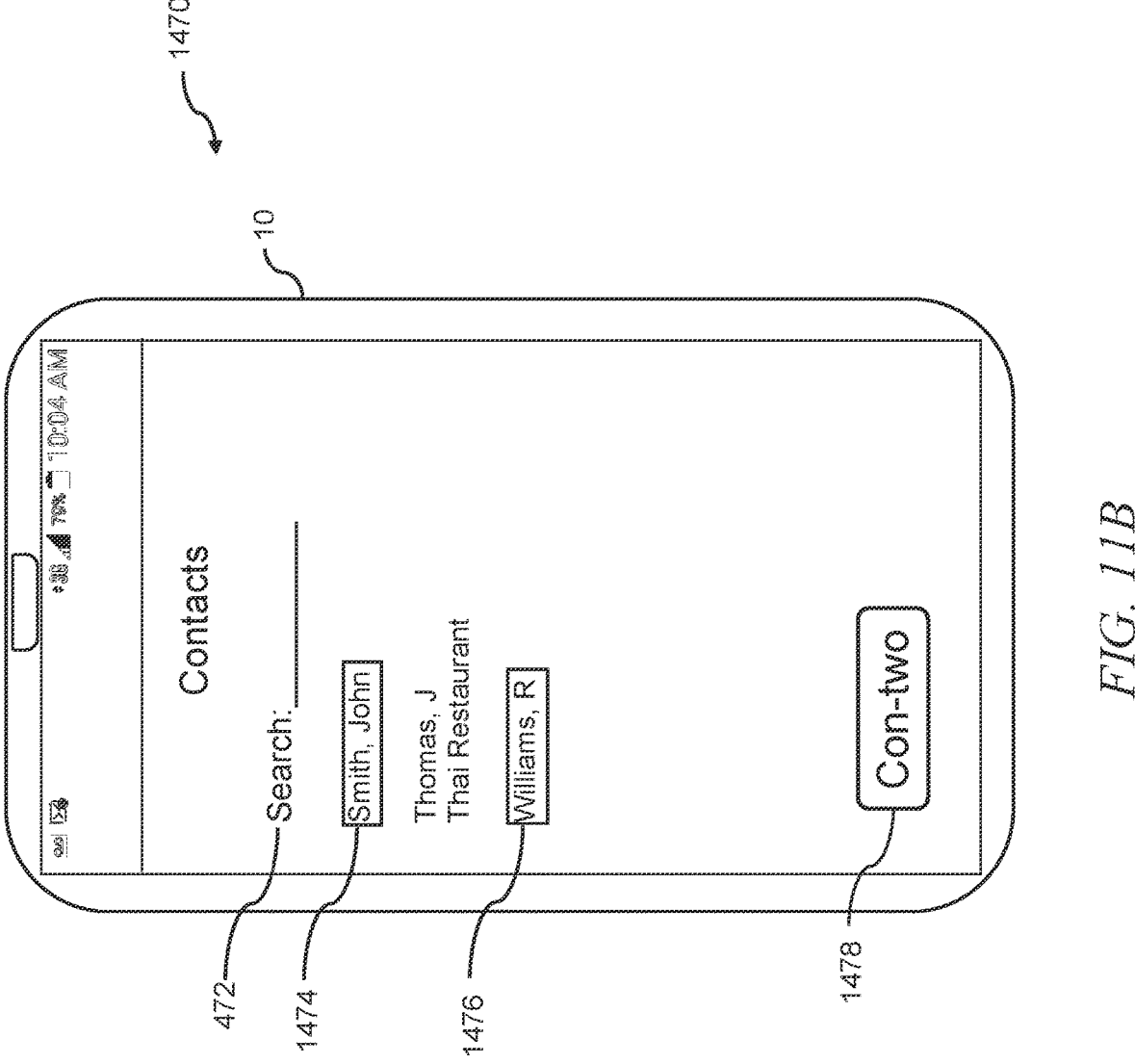
FIG. 11B illustrates an exemplary user interface for connecting two contacts using the system for common contact management.

In some embodiments of the system for contact management, users have the ability to suggest that two of their contacts share contact information. This provides each of the two contacts a notice that the other of the two contacts is interested in sharing contact information. An exemplary user interface for connecting two contacts 1470 is shown in FIG. 11B. In this, the user has selected two contact 1474/1476. Once the two contacts 1474/1476 are selected, the user operates the connect-two directive 1478 and both users receive accept user interfaces 420/420A. In one embodiment, each user receives accept user interfaces 420A in which the reason 423 is that the initiating user suggests they connect.

Figure 12:
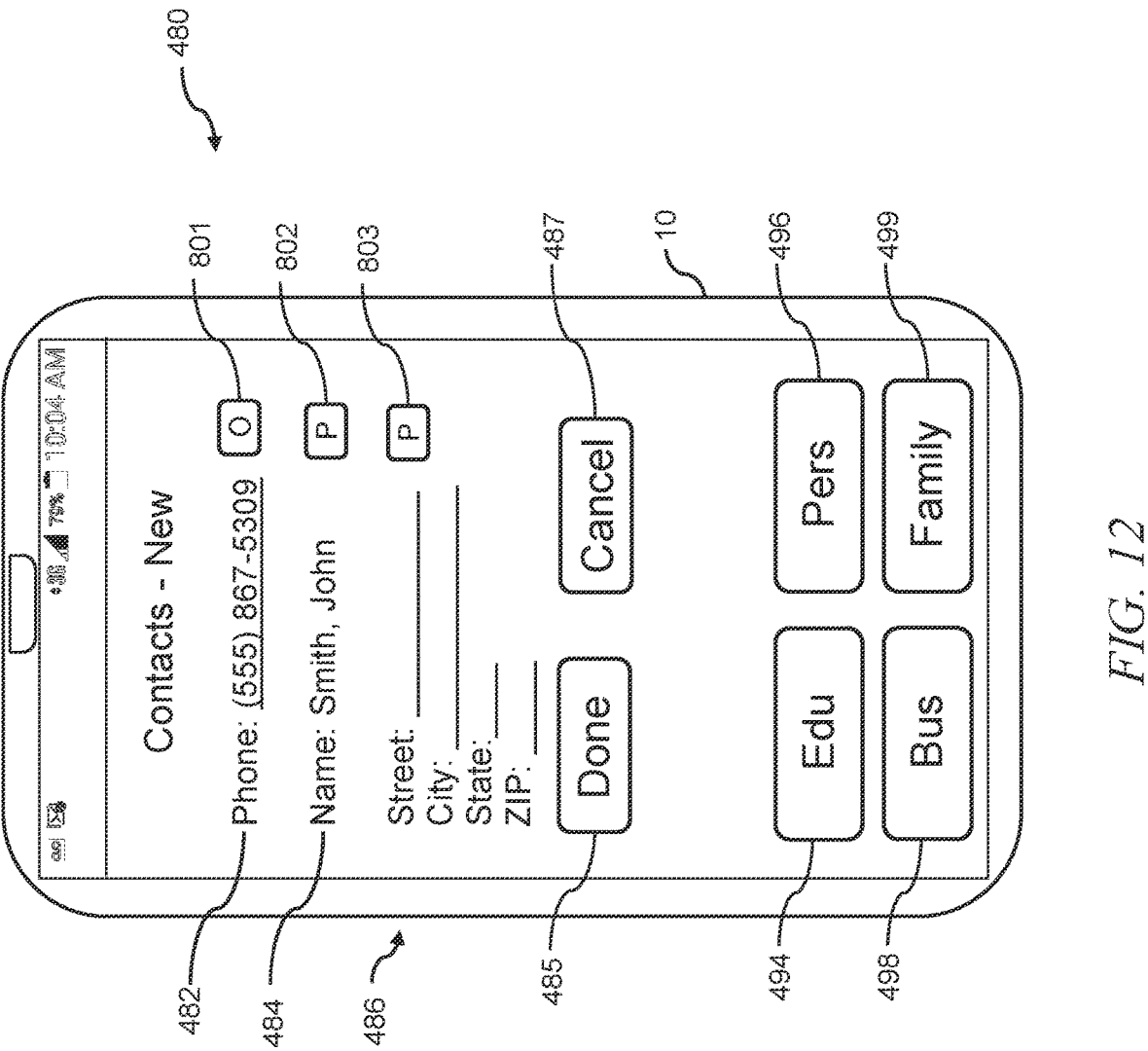
FIG. 12 illustrates an exemplary user interface for entering contact information into the system for common contact management.

When first using the smartphone application of the system for common contact management, a user must establish minimal contact information using a new contact user interface 480 as shown in FIG. 12. Note that in some embodiments, a subset of the inputs is required when creating a new contact. The phone number 482 of the contact must be entered, as that is the key for the contact records 520 (see FIGS. 13, 13A, 13B). In addition, the name 484 associated with that phone number 482 is likely required. This is the name of the owner of the phone number, either a person (e.g. John Smith) or and establishment (e.g. Thai Restaurant). Further information 486 is entered to complete the contact entry such as address. A cancel directive 487 is provided to abort contact entry.

In some embodiments, the phone number 482 is extracted from the device (e.g. smartphone 10), for example by reading the SIM card 88. This inherently provides some level of security and assurance that the phone number 482 is correct and a real phone number. In some embodiments, other verifications are made through US mail, text messages, email, etc. For example, a post card with a secret code is mailed to the address given, a text message with a secret code is sent to the phone number 482, a voice call is made to the phone number 482, an email with a secret code is sent to the email address provide, etc. The user must enter the secret code to activate their contact record 520.

After the initiator has entered all required and whatever optional data is desired, the initiator selects the "done" directive 485 to save the contact record 520 and upload the contact record 520 to the server 500 for storage in the data storage 502.

In some embodiments, a "global" directive 801/803 is associated with each field in the new contact user interface 480 (and sub-user interfaces). The "global" directive 801/803 provides the ability for the user to make certain data of the contact record 520 available to all user of the system for common contact management, much like putting that information in the white pages of a paper phonebook. In the example of FIG. 12, the phone number 482 is open 801, the name 484 is private 802 and the address (further information 486) is private 803. By selecting (e.g., touching, clicking) the open directive 801, the open 801 changes to private. By selecting (e.g., touching, clicking) the private 802/803, the private 802/803 changes to open. In making information global, the user is able to control what others can search and, once the user is found by another user, that user then can request a connection to the user. For example, a user that is new in town searches for others who enjoy volleyball. Records of users who have "volleyball" in the hobby/interest field 521A (see FIG. 13) and have indicated that the hobby/interest field 521A is open 801 are displayed so that the user can request a connection to one or more of those returned from the search. Likewise, a user who is interested in dating another user will search for certain attributes (likes, education, marital status, etc.). A list of other users that have made such attributes globally open 801 is returned for review and possible requesting of connection.

Although, in some embodiments, a scrolling list of all possible data entry fields for the new contact is presented, in the embodiment shown, additional data entry is segmented into categories. The categories include, for example, education data 494 (e.g., schools, colleges, experience); personal data 496 (e.g. food likes, dislikes, hobbies, etc.); business information (e.g., business phone, business address, business room number, business cellular number, etc.); and family information 499 (e.g. parent names, children, contact numbers, etc.).

By having a unique contact record for each phone number, when an initiator updates date in their contact information using a similar interface to that in FIG. 12 (e.g. changes their email address), the master contact record 520 is updated in the storage 502. Thereafter, whenever a recipient connects to the server 500, updates to the contact record 520 of the initiator are downloaded and cached in the recipient's contact database. Further, if the initiator decides to redact their contact information from the recipient, whenever the recipient connects to the server 500, the contact record 520 of the initiator is deleted from the recipient's phonebook or, in some embodiments, the recipient no longer receives updates of the contact record 520.

By having unique correlations between phone numbers and users, in particular people who are associated with the phone numbers, unique capabilities are anticipated. One such unique capability is user feedback/ratings. Many websites gather rating information for goods and services. For example, a travel web site maintains detailed reviews of travel destinations and hotels. Each reviewer provides a rating (e.g. one to five stars) and a written review. To gain credibility, before being able to provide review information, one must register with this travel web site. This prevents some radical reviews and adds some credibility and traceability to each review, but a reader has no idea of the types of people that are providing the reviews. For example, one person leaving an "unclean room" review might have a much different opinion of what is clean than the reader of the review. By maintaining one's contact list, this travel web site is able to display whether the reviewer is in your phonebook, perhaps a review that you might trust. In some embodiments in which your contact list includes the type of contact information that has been allotted to you (e.g., friend, family), the review will indicate that the reviewer is a family member or a friend, lending much more credibility to the review.

Figure 12A:
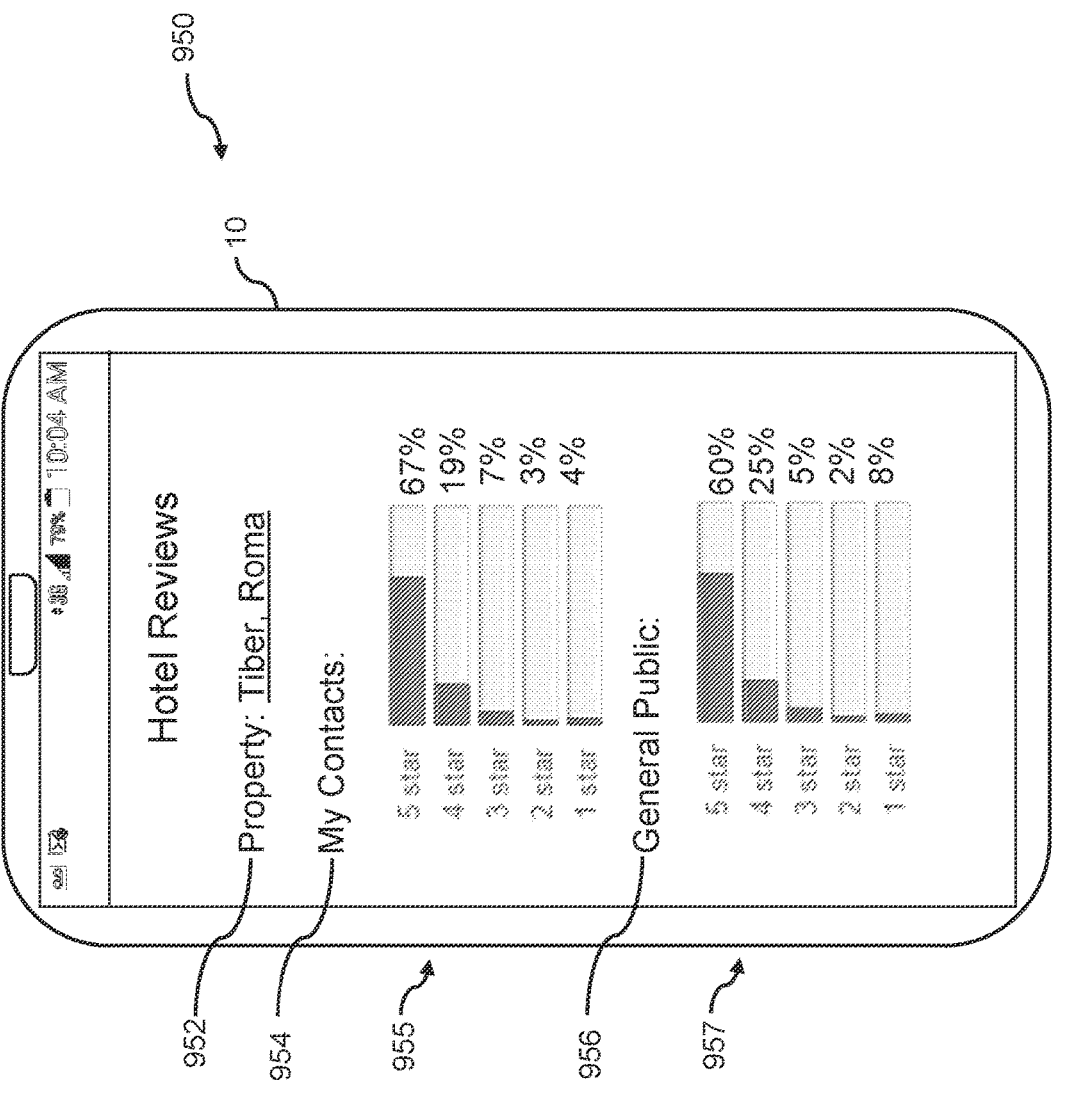
FIG. 12A illustrates an exemplary user interface for reviewing feedback of an establishment using data from the system for common contact management.

An exemplary review 950 of a fictitious hotel is shown in FIG. 12A. In this example, the property 952 is listed. Before presenting the review, the web site or application prepares the reviews by sending a query to the system for common contact management including identification information of the initiator and identification information of all reviewers for the property 952. The system for common contact management responds with the identification information of all reviewers for the property 952 that are within the initiator's group (e.g., all that have shared contact information with the initiator, all that are in the same association 800—see FIG. 13A). In some embodiments, the identification information includes a list of phone numbers of all contacts that are currently shared with the user.

The web site now prepares and presents two sets of review data 955/957. The first review data 955 (labeled "My Contacts" 954 in this example) shows how the initiator's contact have reviewed the property 952 while the second review chart 957 (labeled "General Public" 956 in this example) shows how all reviewers have reviewed the property 952. If the initiator proceeds to inspect individual reviews, the initiator has the ability (not shown for brevity reasons) to inspect all reviews or inspect only reviews of the initiator's group (e.g., all that have shared contact information with the initiator, all that are in the same association 800—see FIG. 13A).

In some embodiments, the user has features to request all reviews, to request reviews from only from those in the user's contact list 700 (see FIG. 13), and/or to request reviews from only from those in the user's contact list 700 (see FIG. 13) and in the contact lists 700 of each user in the user's contact list 700 (e.g., a first level of indirection).

In addition, since the system for common contact management provides a level of security and trust, when a user of the system for common contact management writes a review, the web site hosting that review is able to tag that review with knowledge of the user who wrote the review.

It is also anticipated that the review feature be made available to any contact management system. For example, an interface (e.g., Application Program Interface—API) is provided by contact management systems that returns a list of phone numbers in the user's phonebook. An application that displays review data (e.g., as in FIG. 12A) calls this API to discover the list of phone numbers in the user's phonebook, then uses the list of phone numbers to present review data segmented by those in the user's contact list (e.g., the review data 955 of FIG. 12A). In this scenario, since there are no second-level capabilities (e.g., the API does not know the contact lists of each contact in the user's phone book), only one level of review lists is anticipated.

Another use of the contact data is direct marketing. If likes, dislikes, hobbies, etc., are included in each person's contact information, the first person has the ability to share contact information with a second person that is an establishment. For example, an initiator has detailed likes and dislikes concerning food—like fish, likes beef, dislikes pork. . . . If the establishment is a restaurant and received a huge delivery of fish that will not keep for more than three days, that restaurant can direct market to the first person, perhaps offering a coupon that is good for tonight for a fish dinner or a free bottle of wine with the purchase of two fish dinners, etc.

In FIG. 13, an exemplary set of contact records 520 as stored in data storage 502 are shown. In this simplified example, only three contact records 520 are shown, a first record 520A for Julie Smith, a second record for Steve Smith 520B, and a third record 520C for a restaurant, Thai Bowl. Note that these contact records 520 contain all information that has been entered by the owner of the individual records 520A/520B/520C. As described above, when sharing a user's contact record with another, the initiator has directives for restricting which parts of the contact record is shared with the recipient. In the simplified contact record 520A shown in FIG. 13, each subset of data within the contact record 520A is selectively shareable with the recipient. For example, if the recipient is a business acquaintance, then the office phone number is shared, but perhaps the initiator does not want the recipient to have access to the initiator's personal cell phone number, home address, food likes/dislikes, hobbies, and family information. In another example, if the recipient is a family member, then the initiator's cell phone number, likes/dislikes, hobbies and family information is shared, but perhaps the initiator does not want the recipient to have access to the initiator's office phone number so as to not be interrupted at work by the family member.

A set of linkages are shown in FIG. 13 for one recipient 702 (e.g. John Smith). When an initiator allows a recipient access to some or all of the initiator's contact information, one way anticipated to track what portions of the initiator's contact information are accessible by the recipient is to maintain a set of linkages for each recipient (although a single set of linkages is shown for brevity reasons, any number are anticipated). In the example of FIG. 13, the recipient 702 has been provided access to two contact records 520A and 520C through two links 704/708. The first link 704 provides access to a first contact record 520C for Thai Bowl while the second link 708 provides access to a second contact record 520A for Julie Smith. In the first link 704, there is a flag or data value 706 indicating that all fields of the first contact record 520C are accessible by John Smith. In the second link 708, there is a flag or data value 710 indicating that only the phone number and address portions of the second contact record 520C are accessible by John Smith. Again, this is a simplified example and there are many types and combinations of flags or data values for the various subsets of the contact records.

Note that the contact record 520A shown in FIG. 13 includes a list of hobbies in the hobby/interest field 521A. One such hobby is sky diving. In some embodiments, if the owner (Julie Smith) opts-in to targeted marketing, companies will have the ability to directly market products to the owner of the contact record 520A (Julie Smith). For example, the owner of the contact record 520A (Julie Smith) has opted-in and when a provider requests contacts for all users that have opted-in having a hobby of "sky diving," that provider will receive a selected portion of the contact record 520A (Julie Smith). In some embodiments, the selected portion is restricted to the owner's name 523A and email address 527A. In some embodiments, the selected portion is restricted to the owner's phone number 525A. In other embodiments, other combinations or portions of the contact record 520A is sent to the provider for direct marketing to the owner of the contact record 520A (Julie Smith).

In some embodiments, the user has the ability to opt-in to allowing others to find that user using some or all data within the user's contact record 520. For example, if the user opts-in to allowing others to find them using their hobbies or current school, others having their own contact record 520 can request a connection to that user (e.g. through an interface such as 410/410A/410C as shown in FIGS. 5, 5A, and 7). This lets users with similar hobbies, organizations, values, likes, etc., find each other or find other organizations such as churches, joining a team, schoolmates, etc.

Figure 13A:
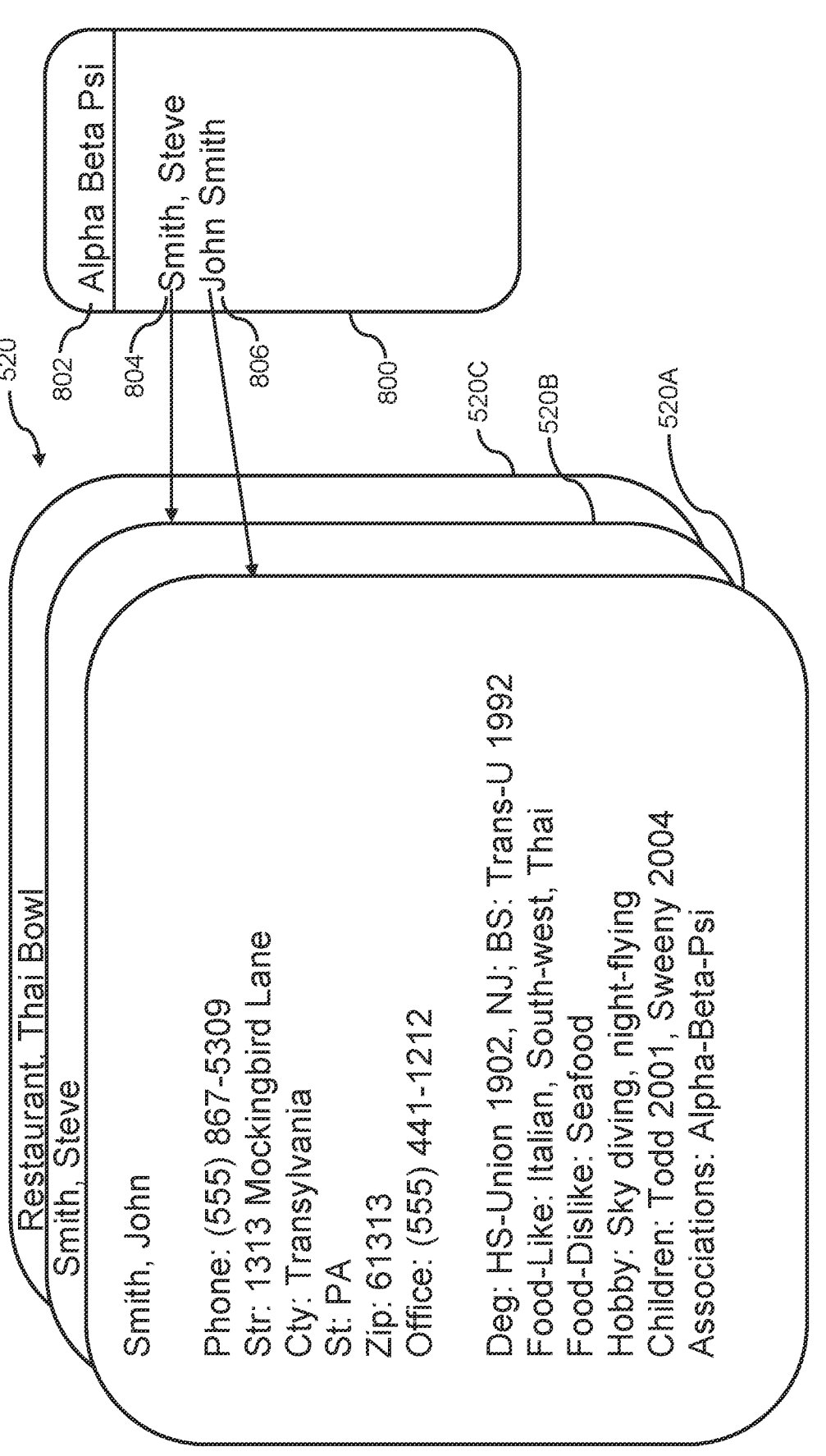

In FIG. 13A, an exemplary set of contact records 520 as stored in data storage 502 are shown. In this simplified example, only three contact records 520 are shown, a first record 520A for John Smith, a second record for Steve Smith 520B, and a third record 520C for a restaurant, Thai Bowl. Note that these contact records 520 contain all information that has been entered by the owner of the individual records 520A/520B/520C. In this example, an association list 800 is shown. An association is a list that each user directly or indirectly opt into. By directly, the user makes a request to be added to the association list 800, for example by requesting inclusion through an administrator of the association list 800. By indirectly, the user is added to the list 800 by joining an organization. In the example of FIG. 13A, two users are part of an association 802 (Alpha Beta Psi), for example, members of a fraternity, employed by a company, etc. As shown, the list 800 includes a first link 804 corresponds to the contact record for Steve Smith 520B and a second link 806 corresponds to the contact record for John Smith 520A. It is anticipated that a typical association list 800 will include many links to contact records 520 as any number is anticipated. It is also anticipated that an administrator be assigned having privileges to add and remove links 804/806 to/from the association list 800.

Another use for the association list 800 is to group contact records 520 that have a common bond. For example, if the individual establishments within a mall each have contact records 520, then an association list 800 is created with links 804/806 to each of the individual contact records 520 of the individual establishments. Having such association lists 800, the user interface initially shows information regarding the mall (e.g., a contact for the mall) but as the user approaches the mall (e.g., as determined by the reading the GPS subsystem 91), the user interface expands showing each of the individual establishments. As the user enters the mall, the user interface further expands showing the individual establishments that are near the user. When the user enters one of the establishments, the user interface includes details of the products and any special offers currently running.

Figure 13B:
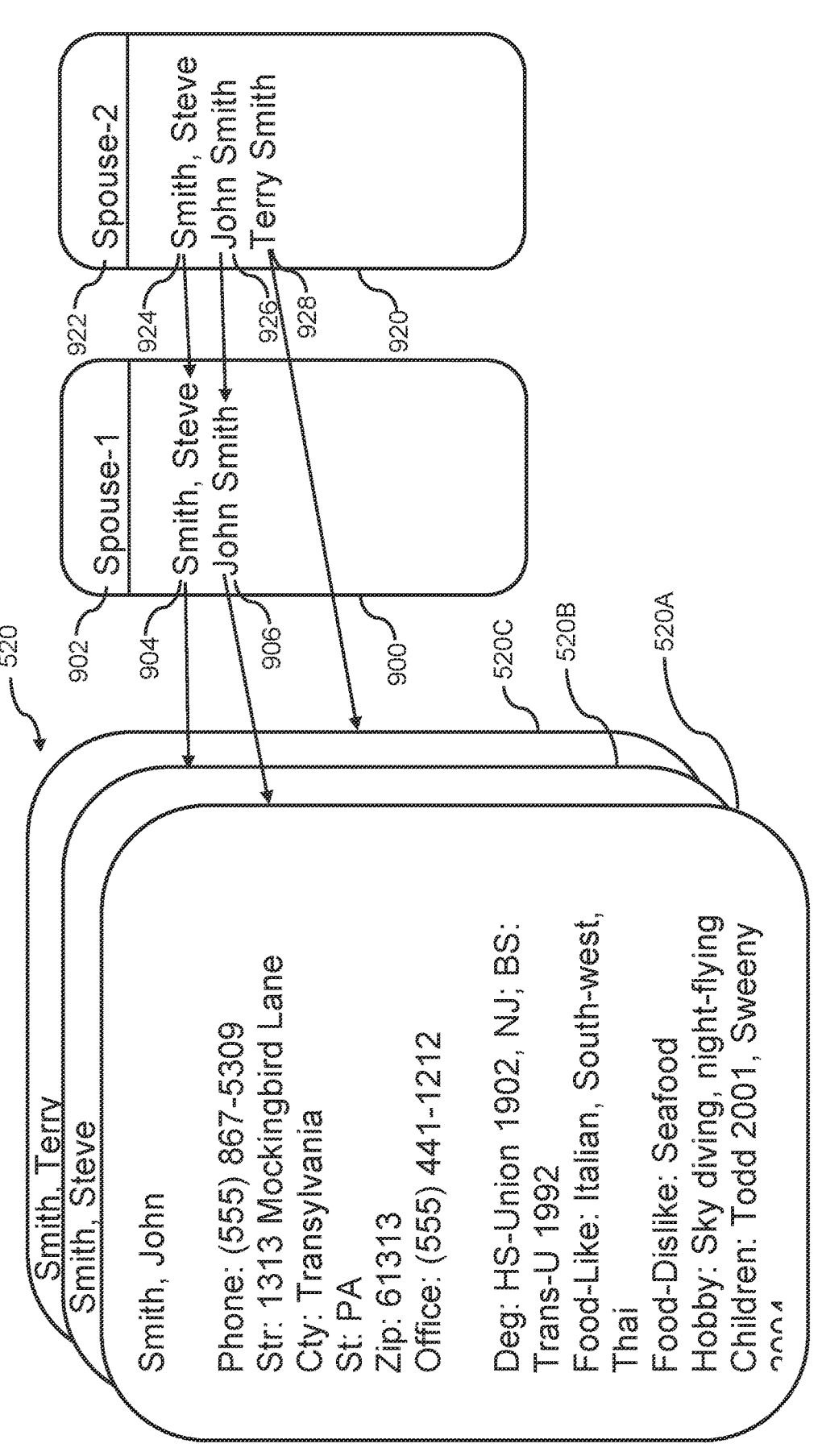

In FIG. 13B, an exemplary set of contact records 520 as stored in data storage 502 are shown. In this simplified example, only three contact records 520 are shown, a first record 520A for John Smith, a second record for Steve Smith 520B, and a third record 520C for a Terry Smith. Note that these contact records 520 contain all information that has been entered by the owner of the individual records 520A/520B/520C. In this example, a family association is shown using a pair of association tables 900/920. A family association is an inherited association through declaration that one user (e.g. spouse-1 902) is related to and has access to some or all contact records of another user (e.g. spouse-2 922). For clarity reasons, the example shown uses a spousal relationship, though any family relationship of other inheritance is anticipated using the same, different, or similar structures. For example, a child is the first user and a parent is the second user. The parent has access to all the contacts of the child should the parent need to contact one of those contacts, for example, to arrange carpooling or if there is an emergency. In this scenario, it is likely a one-way relationship, in that the parents contacts are not visible to the child, while in a spousal relationship, it is likely a two-way relationship where each spouse has access to the other spouse's contacts.

In some embodiments, the giving family member has the ability to exclude certain contacts from the receiving family member's list. For example, one spouse may exclude business contacts from the other spouse or a child may provide access to a parent of only professor contacts, but not dating contacts.

In the scenario shown, spouse-1 902 has provided access for two contact records 520A/520B to spouse-2 922. In the association table 900 for spouse-1 has access to two contact records 520A/520B through a first list element 904 for Steve Smith and a second list element 906 for John Smith. Note, it is fully anticipated that the list elements 904/906 include flags or data values 706/710 as shown in FIG. 13, which are not shown for brevity and clarity reasons. The first user, spouse-1 902, has allowed access to his/her contacts by declaring the second user, spouse-2 922 a spouse (or other significant other). In making such a declaration, the second user, spouse-2 922 gains access to both contact records 520A/520B through a first link 924 to first list element 904 (Steve Smith) and a second link 926 to second list element 906 (John Smith). By providing the links 924/926, the second user, spouse-2 922 has access only as long as the first user, spouse-1 902, has access to those contact records 520A/520B along with any restrictions to access of those contact records 520A/520B enforced by flags or data values 706/710 as shown in FIG. 13.

The list 920 for the second user, spouse-2, includes an additional link 928 that corresponds to a contact record 520C for Terry Smith. In this scenario, the second user, spouse-2 922, has not declared the first user, spouse-1 902, as a spouse and, therefore, the additional link 928 that corresponds to a contact record 520C is not accessible by the first user, spouse-1 902 until for the second user, spouse-2, declares the first user, spouse-1 902, a spouse.

Figure 14:
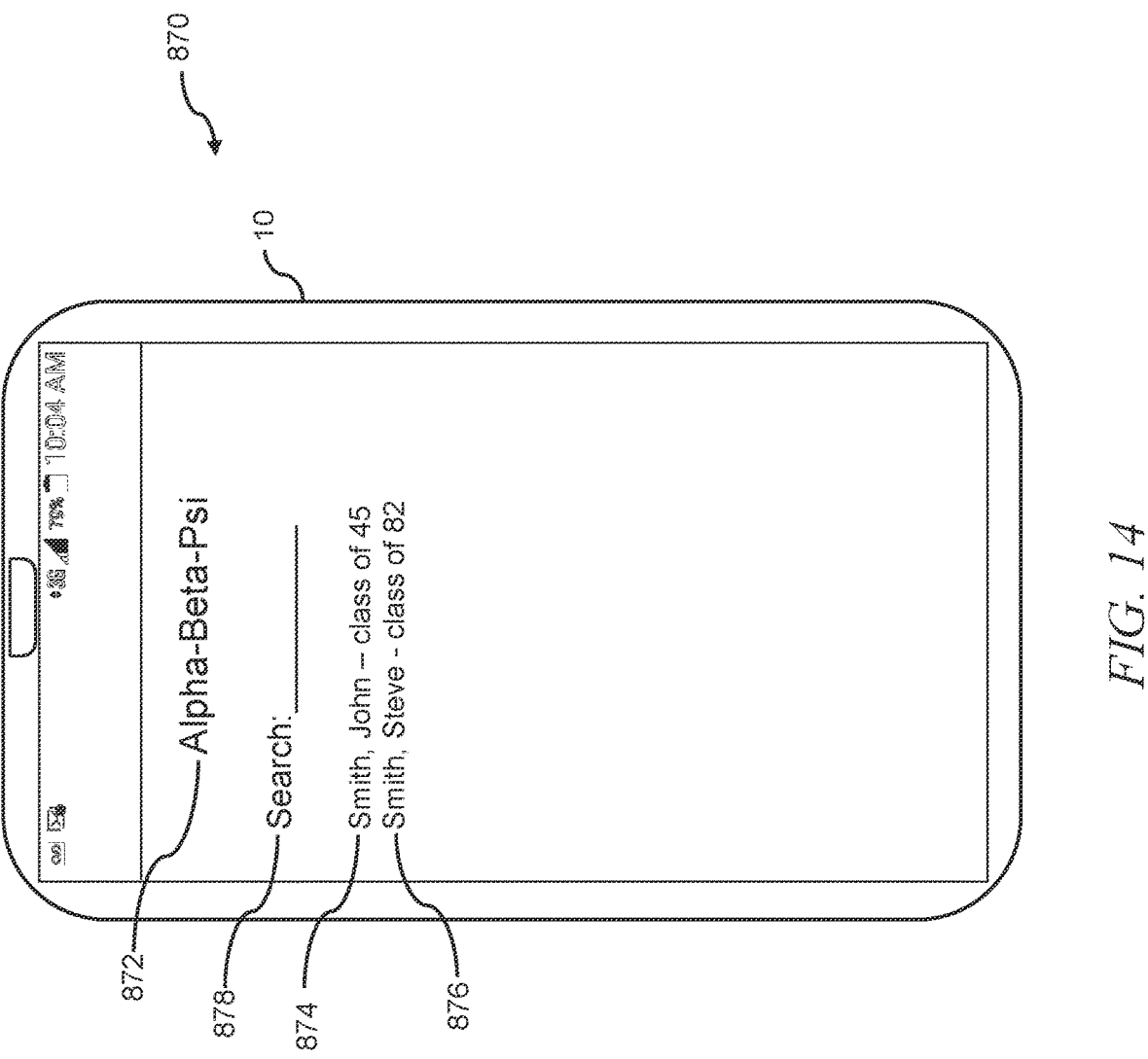
FIG. 14 illustrates an exemplary user interface for displaying contacts from an association using the system for common contact management.

As with the association contacts as described in FIG. 13A, it is anticipated that in some embodiments, linked contacts be partitioned into separate or sub-phonebook lists as shown in FIG. 14, as, for example, another family member may have a huge number of contacts that the first family member does not want included in their primary phonebook. It is also anticipated that other contact sorting is performed based upon categories, folders, type of contact, etc.

In FIG. 14, an exemplary user interface for displaying/searching contacts 870 of the system for common contact management is shown. If a user is a member of an association (e.g., an organization, a group, a list of users), the user has access to contact records 520 for each member identified in the association. In this exemplary user interface for displaying/searching contacts 870, the association 872 is displayed on the smartphone 10 (Alpha-Beta-Psi) and the members of the association are displayed (for brevity reasons, only two members 874/876 are shown). In some embodiments, a search field 878 is provided for the user to enter search criteria such as name, year graduated, or other attributes.

In some embodiments, the association lists are selected through a user interface of the phone contact management interface 470 (see FIG. 11) through, for example, drop-down lists, swiping of a touch screen to the left or right, or any way known in the industry. It is anticipated that a user is a member of no associations, one association, or any number of associations.

Figure 14A:
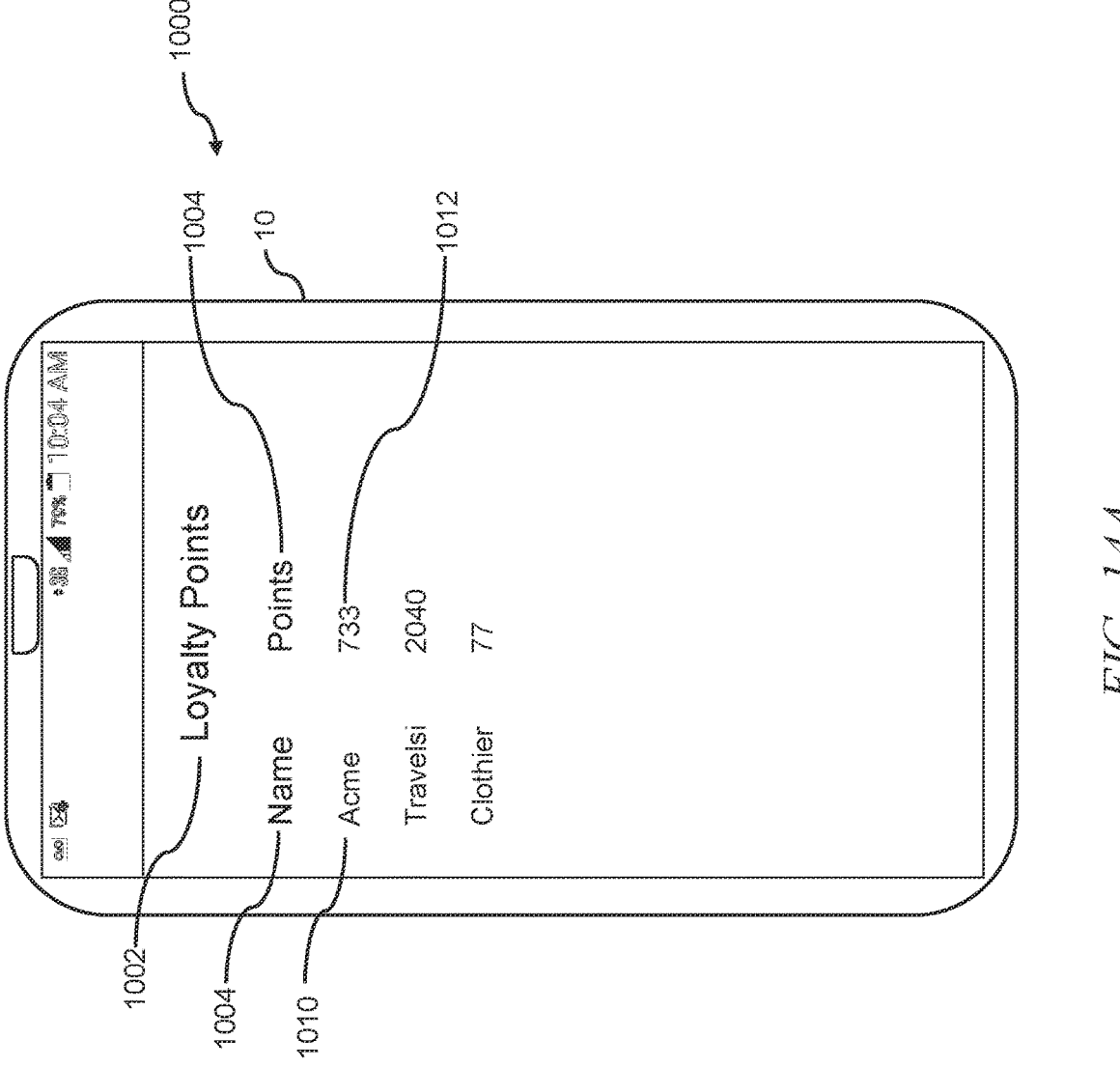
FIG. 14A illustrates an exemplary user interface for displaying loyalty points of the system for common contact management.

In FIG. 14A, an exemplary user interface for displaying loyalty points 1000 of the system for common contact management is shown. Many retailers, hotel chains, airlines, service providers, etc., reward their clients with loyalty points that are typically redeemable for products, travel, hotel stays, etc. In the past, retailers, hotel chains, airlines, service providers, etc., had their own system for managing, tracking, and reporting the loyalty points. As the system for common contact management includes a unique identity for each user (e.g., a single contact record 520 per user), enabling the system for common contact management to manage some or all of loyalty point management. For example, when a user of the system for common contact management enters a retail location, using the GPS subsystem 91 of the user's device (e.g., smartphone 10), the system for common contact management knows that the user is at that specific retail location and, per algorithms pertaining to that retailer, the system for common contact management calculate loyalty points for visiting the retailer, even when no purchase is made. In another example, another application operating on the user's device notifies the system for common contact management of an activity or location of the device. For example, such application recognizes an image capture of a special logo identifying a service and participant in that service.

The loyalty points are accumulated, along with loyalty points earned for purchases. In FIG. 14A, the exemplary user interface for displaying loyalty points 1000 displays a user's loyalty points 1004 for several organizations sorted by name (e.g., name of the retailer, company, service, etc.). For example, the user has 733 points 1012 for the retailer named, "Acme" 1010.

Figure 15:
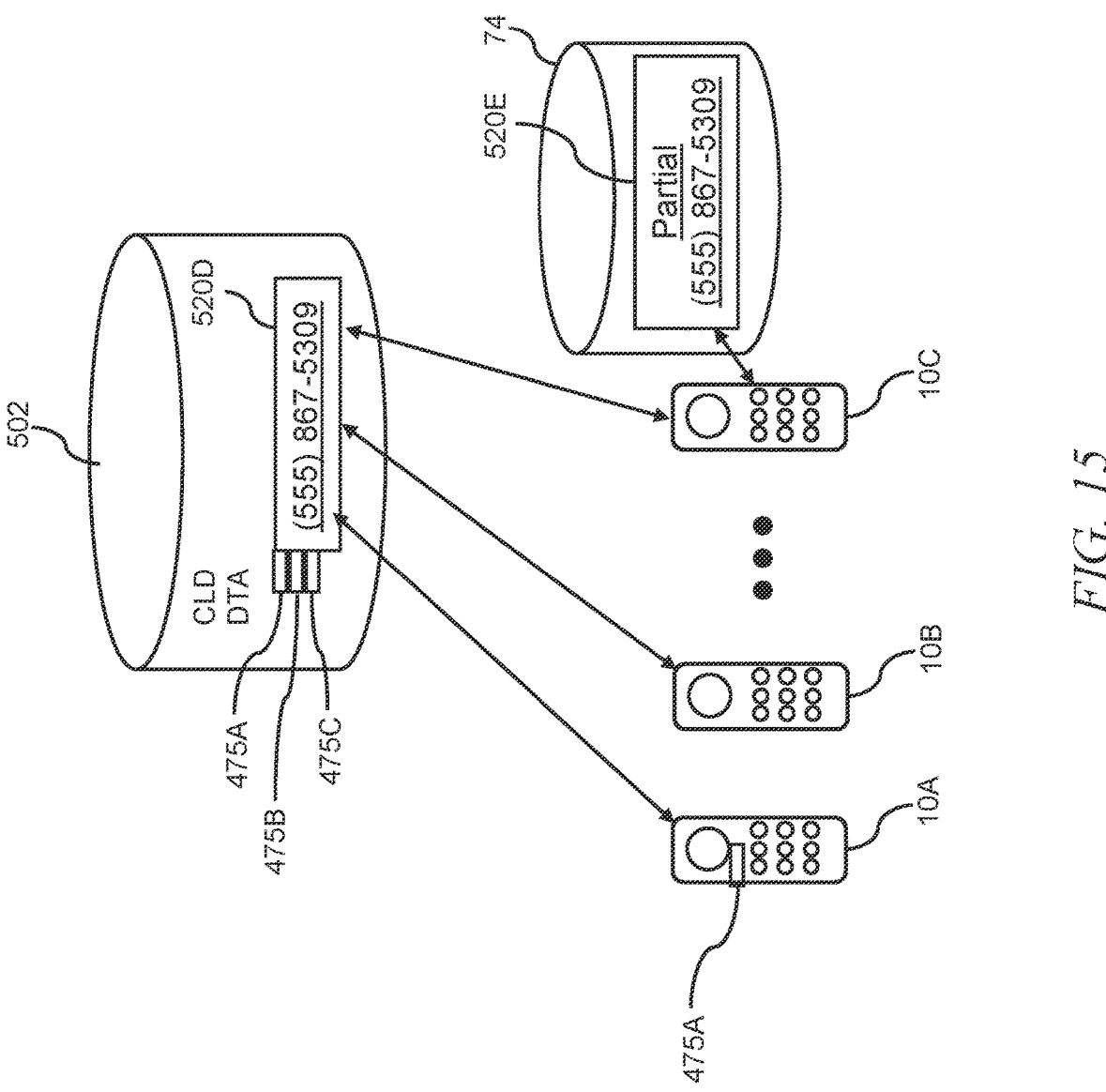
FIG. 15 illustrates a connected data graph of the system for common contact management.

In FIG. 15, a connected diagram is shown with multiple devices 10A/10B/10C connected to a single data record 520D, stored in the storage 502. The record 520D in the storage 502 contains all information entered regarding this phone number (e.g. 555-867-5309). Three devices 10A/10B/10C are shown for brevity reasons, as any number of devices (e.g. smartphones 10) are anticipated.

Being that the contact record 520D contains all information regarding the user associated with that phone number, no direct access to the contact record 520D is allowed. Instead, when the initiator provides contact information to the recipient, only the information allowed by the initiator (e.g. a partial contact record 520E stored in the persistent memory 74 of the smartphone 10) is cached into the recipient's device 10A/10B/10C. Therefore, although each device 10A/10B/10C share some common information from the contact record 520D, some of the devices 10A/10B/10C will have more or less information from the contact record 520D. For example, each device 10A/10B/10C has name and address information, but two smartphones 10A/10B (e.g. parents of the owner of contact record 520D) will have total access to all information.

In this example, the contact record 520D includes several annotations 475A/475B/475C entered by three different users. The user of the first user device 10A had annotated this contact record with an annotation 475A as described previously and the annotation is associated (or stored) with the contact record 520D. When the first user access this contact record 520D, that user also has access to the annotations 475A for that contact record 520D, even when that user access this contact record 520D from a different device such as a desktop, laptop, or tablet computer.

Referring to FIGS. 16-19, exemplary program flows of the system for common contact management are shown.

It is anticipated that portions of the exemplary program flow execute on a user device such as a smartphone 10 while portions of the exemplary program flow execute on the server 500.

Figure 16:
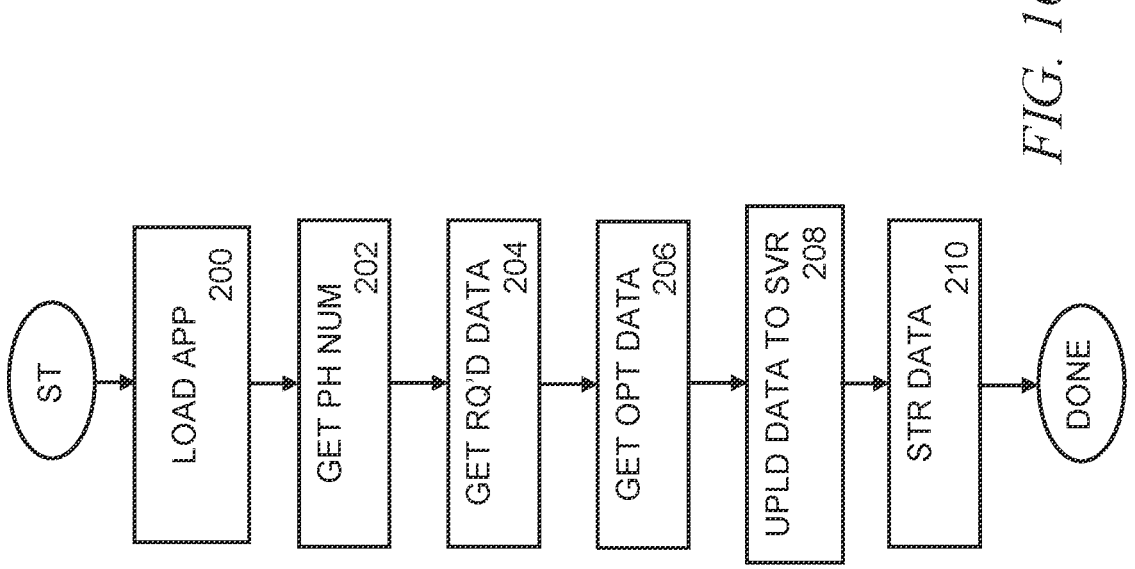
FIG. 16 illustrates an exemplary program flow of the system for common contact management m.

In this example, starting with FIG. 16, the flow starts when the initiator creates or modifies their contact record 520, as for example, using an interface such as the new contact user interface 480 shown in FIG. 12. The smartphone application is loaded 200, as known in the industry. The application starts by obtaining 202 the phone number 482 of the smartphone 10 (or another device). For many devices with assigned phone numbers (e.g. smartphones 10), the application reads the phone number 482 from the operating system of the smartphone 10, For setting up a contact record 520 for other devices such as land-lines, the initiator enters the phone number 482 using, for example, an on-screen numeric keypad 416. Next, data is inputted 204/206, including inputting 204 of required data (e.g. the name 484 and address 486) and inputting optional data 206 (e.g. email, date of birth, work information), if any. Once all data has been entered, the initiator selects the "done" directive 485 and the contact record 520 is uploaded 208 to the server 500 and the server stores 210 the contact record 520 in the storage 502.

Figure 17:
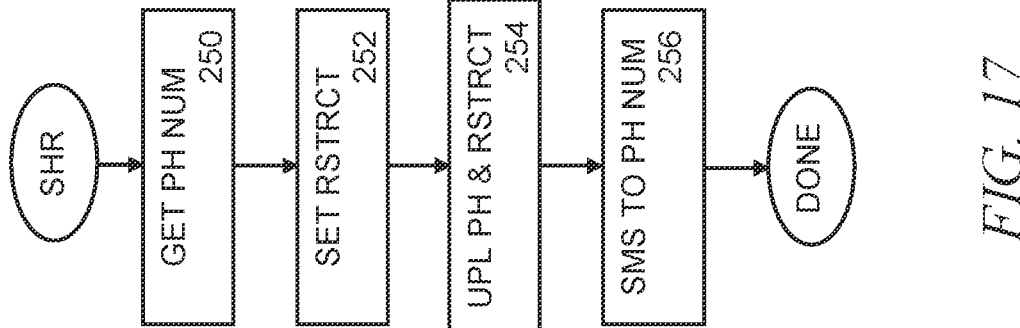
FIG. 17 illustrates a second exemplary program flow of the system for common contact management.

When the initiator shares some or all of the initiator's contact record 520 with a recipient (as in FIGS. 5 and 7-10), the first step (as shown in FIG. 17) is to obtain 250 the phone number 482 of the recipient. Next, if restrictions are desired or if a specific category of recipient 432/434/436 is selected, a set of restrictions are set 252. Next, the phone number 482 and set of restrictions are uploaded 254 to the server 500 and stored in the storage 502. Later, when the recipient accesses the server 500, the recipient's phone number 482 is compared to the stored phone number 482 to determine permissions and which data within the contact record 520 is allowed to be downloaded to the recipient.

Now a message is sent 256 to the recipient's phone (e.g. an SMS to the phone number 482). This message (e.g. text, SMS) is either viewed by the recipient (if the recipient has not yet loaded the application) or is received by the application to present the connection user interface 420 as in FIG. 6.

Figure 18:
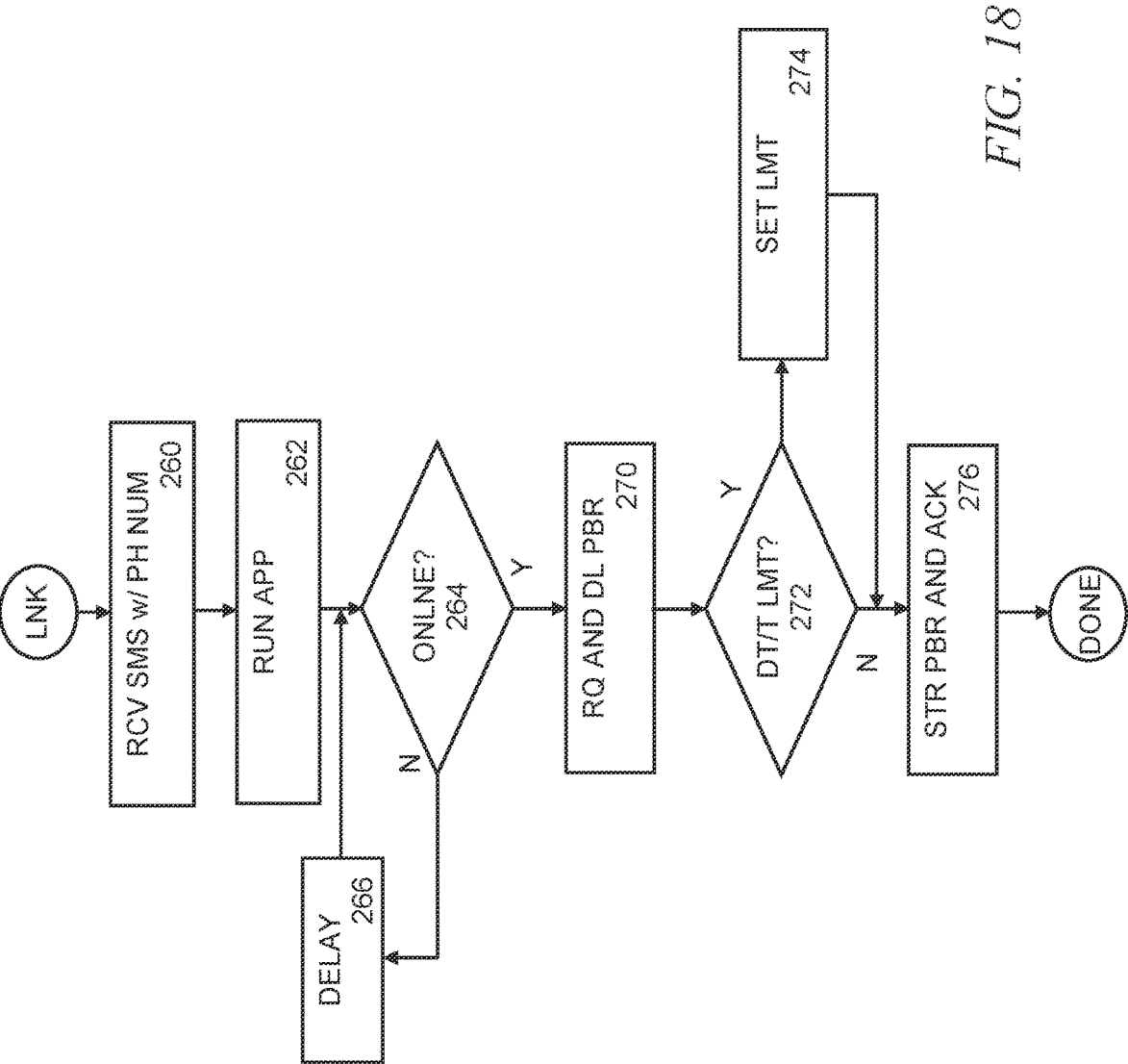
FIG. 18 illustrates a third exemplary program flow of the system for common contact management.

In FIG. 18, it is shown what happens at the recipient's device (e.g. a smartphone 10). The message is received 260 and the application runs 262. A test is performed to determine if the recipient's device is online 264 (e.g. has connectivity to the server 500 through the internet 506 and/or cellular network 68). If the device is not online 264, a delay 266 is performed and the test is performed again until it is determined that the device is online 264. Once online 264, a request 270 is sent to the server 500 and information from the contact record 520 is downloaded 270. If the information from the contact record 520 includes a deletion date 272 (e.g. the recipient will lose access to the information from the contact record 520 on Friday), a limit is recorded 274 in the application so that, when the date/time arrives, the application will delete the information from the contact record 520.

The information from the contact record 520 is stored 276 (e.g. cached and made accessible by the recipient's phonebook application) and an acknowledgement is sent to the initiator.

Figure 19:
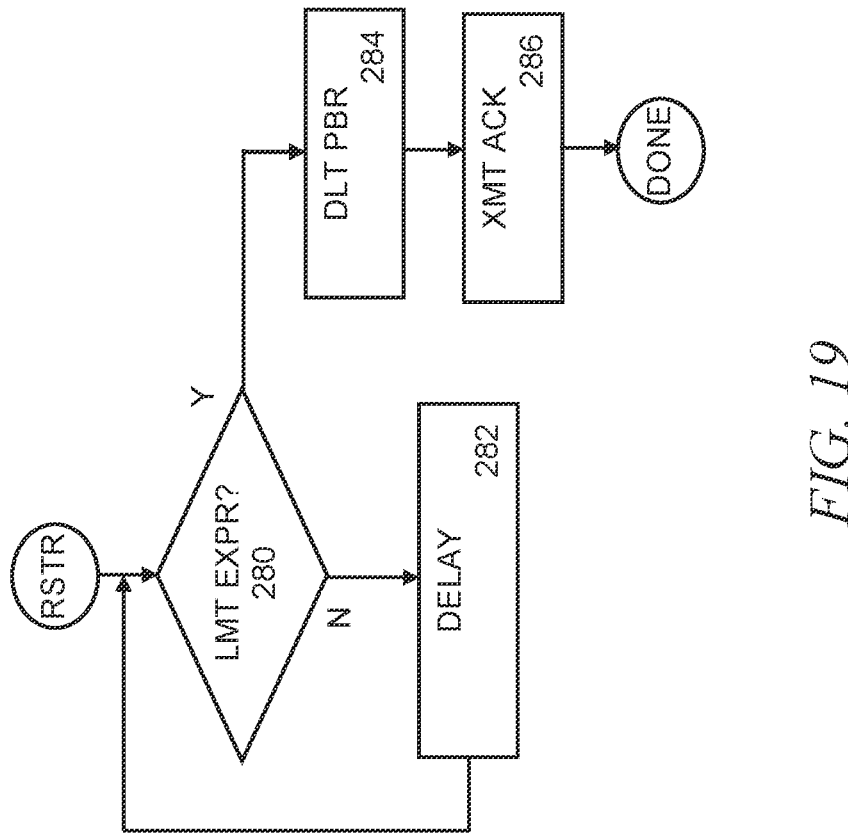
FIG. 19 illustrates a fourth exemplary program flow of the system for common contact management.
Figure 20:
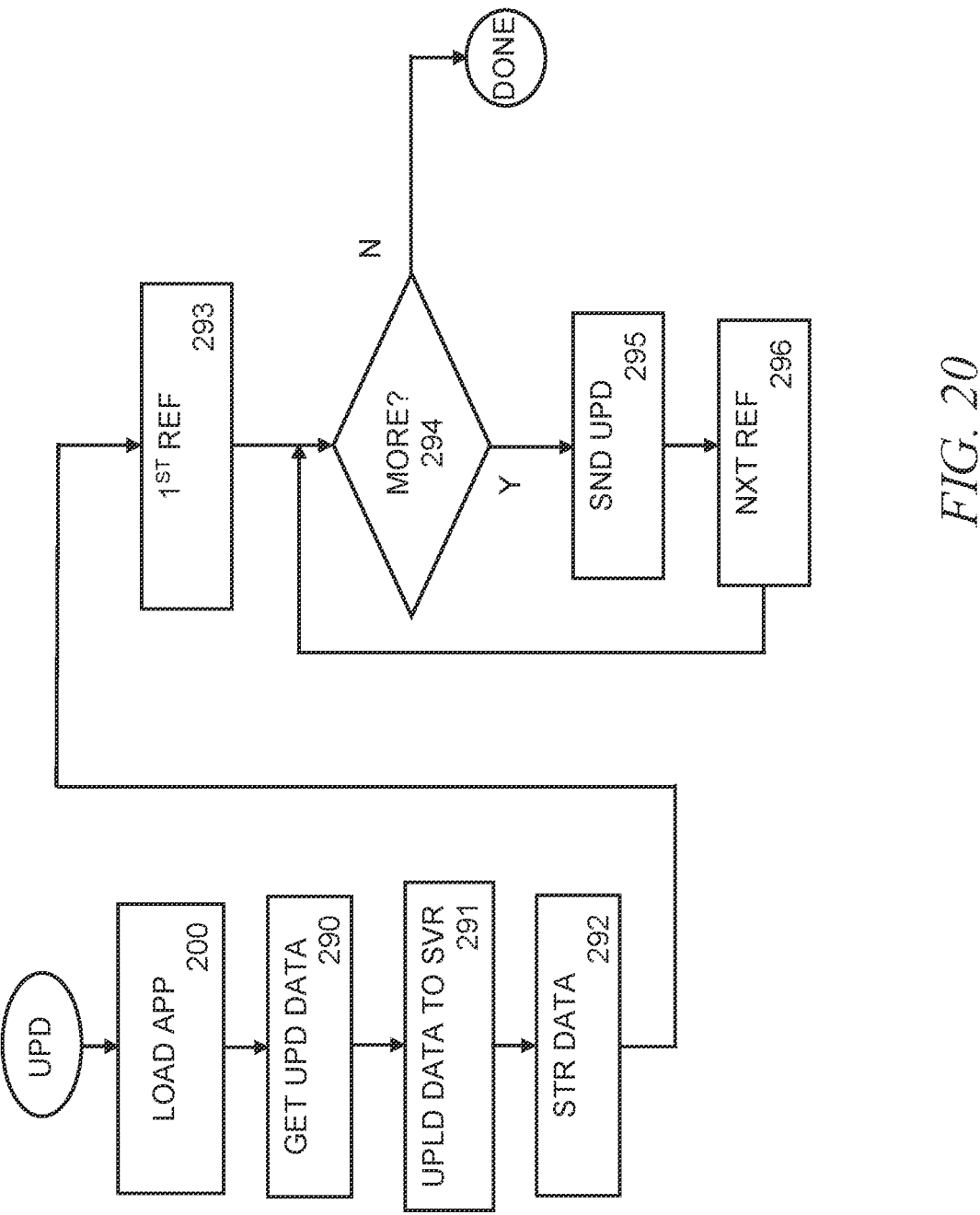
FIG. 20 illustrates a fifth exemplary program flow of the system for common contact management.

In FIG. 19, when the information from the contact record 520 includes a date limit 272 (e.g., the recipient can only access the information from the contact record 520 until Friday), the limit was is recorded 274 in the application. Within the application running on the recipient's device (e.g. smartphone 10), a test is made 280 to determine if the limit has occurred. If the limit has not occurred, a delay 282 is taken and the test is repeated. If the limit has occurred (e.g. it is Friday), the application will delete 284 the information from the contact record 520. In some embodiments, an acknowledgment of the deletion is transmitted 286 to the initiator's device (e.g. smartphone 10), the server 500, or both.

FIG. 16 shows an exemplary flow when a user updates their contact information. When the initiator creates or modifies their contact record 520, as for example, using an interface similar to the new contact user interface 480 shown in FIG. 12, the smartphone application is loaded 200, as known in the industry. The application starts by obtaining 290 updates to data or changes to restrictions. Once all changes have been entered, the initiator selects the "done"

directive 485 and the changes are uploaded 291 to the server 500 and the server stores 292 the updates in the contact record 520 in the storage 502.

Now, the updated contact record 520 or changes are sent to all other users that have access to the contact record 520. A loop starts with loading information (e.g. phone number) of a first user that references the contact record 520. If there are no more users 294 referencing this contact record 520, the loop terminates. If there are more users 294 referencing this contact record 520, an update is sent 295 the that user then the next users 294 referencing this contact record 520 is determined 296 and the loop repeats. This assures that when a user makes a change to their contact record 520 (e.g. changes an email address), all other users that have access to that user's contact record 520 receive updates.

Figure 21:
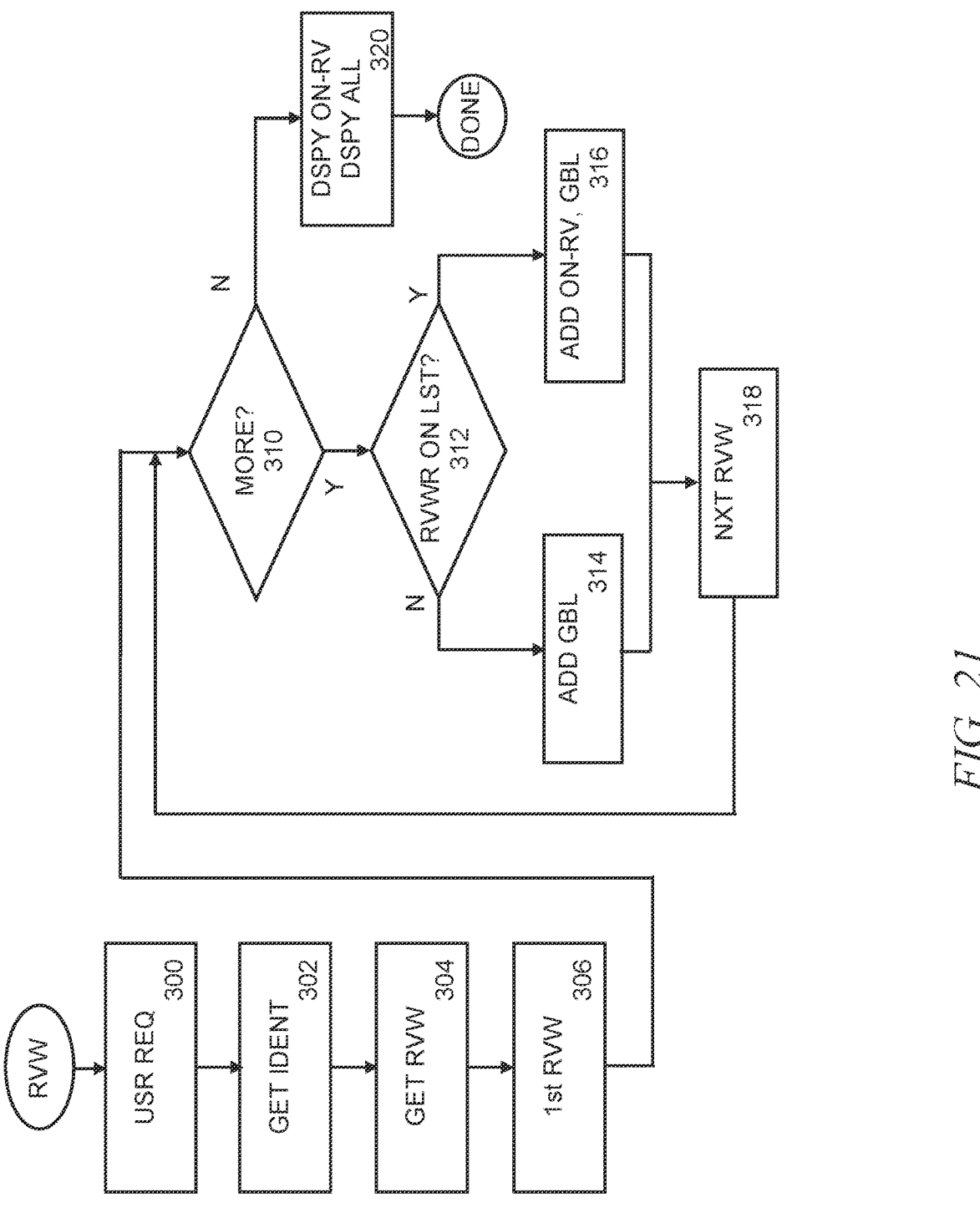
FIG. 21 illustrates an exemplary program flow for generating reviews based upon those in a contact list.

FIG. 21 shows an exemplary program flow for generating reviews that are sorted by those on one's contact list. The flow starts with a user making a request 300 of a web site or an application (e.g., an application running on a device such as a smartphone 10, a personal computer, and a tablet). The web site or application issues a request for identification 302 of those on the user's contact list. In some embodiments, the request is made through an API or other programmatic interface. The request returns a list of identifications such as a list of phone numbers from the user's contact list (e.g., standard smartphone contact list) or contact records 520 as described above.

In some embodiments in which the contact list is also known for each member of the user's contact list, optionally, the API or other programmatic interface returns a larger list of identifications including identifications of each of the user's contacts along with identifications of each of the contacts of each of the user's contacts, providing a second level capability. For example, if the user wants to see all reviews sorted by their own contact, or at a different time, see all reviews sorted by their own contacts and all contacts of their own contacts (e.g., $2^{nd}$ level indirection).

Now the web site or application issues a request for all reviews 304 of a selected product, service, property, etc. This returns, for example, star-ratings from many reviewers of the selected product, service, property, etc. Now, the first review is selected 306 and a loop begins.

The first step in the loop is to determine if there are more reviews 310. If there are more reviews 310, then the current review is tested 312 to see if the reviewer is on the list of identifications. In this example, if the test 312 indicates that the reviewer is on the list of identifications (e.g., the reviewer has a phone number that is in the list of phone numbers), then the review is added to both 316 an on-list and a global list. In this, the reviewer's star rating is counted in the list for both those that are in the list of identifications and in the list of all reviews of the selected product, service, property, etc. If the test 312 indicates that the reviewer is not on the list of identifications (e.g., the reviewer has a phone number that is not in the list of phone numbers), then the review is added 314 to the global list. In this, the reviewer's star rating is counted only in the list for all reviewers and not in the list of those that are in the list of identifications.

Now the next review is selected 318 and the loop continues checking if there are more reviews 310. If there are no more reviews 310, the web site or application displays 320 either or both lists of reviews, for example as one or two bar graphs (as in FIG. 12A), a list of reviews, etc.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A system for contact management, the system comprising:

an initiator device and a recipient device, the recipient device having associated therewith a recipient phone number;

a server, the server having a storage for storing contact records, each contact record comprising a phone number of an owner of the each contact record, one of the contact records being an initiator contact record that is associated with the initiator device;

the recipient phone number is received by an application running on the initiator device, responsive to receiving the recipient phone number, the application running on the initiator device sends a transaction to the server through a network, the transaction comprising the recipient phone number;

responsive to the transaction, software running on the server addresses the recipient device by way of the recipient phone number and the software running on the server sends an invitation transaction to the recipient device;

software running on the recipient device receives the invitation transaction and requests acceptance;

after the software running on the recipient device receives the acceptance, the software running on the recipient device sends an acceptance transaction to the server;

after the server receives the acceptance transaction, the software running on the server sends a contact transaction to the software running on the recipient device, the contact transaction comprising at least part of the initiator contact record; and after the software running on recipient device receives the at least part of the initiator contact record, the software running on the recipient device stores the at least part of the initiator contact record in a phone contact list that is local to the recipient device.

2. The system of claim 1, whereas when the recipient phone number is received by the application running on the initiator device, a restriction is also inputted into the application running on the initiator device and the transaction further comprises the restriction, the restriction defining a relationship between an initiator device user and a recipient device user.

3. The system of claim 2, whereas when the software running on the server sends the contact transaction to the recipient device, the software running on the server includes specific fields of the initiator contact record based upon the restriction in the contact transaction.

4. The system of claim 2, whereas the restriction defines the relationship between the initiator device and the recipient device as a pre-configured restriction selected from a group consisting of co-workers, friends, acquaintances, and family.

5. The system of claim 4, whereas each pre-configured restriction defines a set of pre-selected fields of the initiator contact record and the software running on the server selects which fields of the initiator contact record that are added to the contact transaction based upon the set of pre-selected fields.

6. The system of claim 1, whereas after a change is made to a field of the initiator contact record that was sent to the initiator device, the software running on the server creates an update transaction comprising the field and the software running on the server sends the update transaction to the recipient device, and upon reception of the update transaction by the software running on the recipient device, the software running on the recipient device updates the initiator contact record that is stored in the phone contact list with the field.

7. A method for contact management, the method comprising:

an application that is running on an initiator device receiving a recipient phone number, the recipient phone number associated with a recipient device;

responsive to the application receiving the recipient phone number, the application sending a transaction to a server, the transaction comprising the recipient phone number, the server having access to a plurality of contact records, each contact record comprising fields including at least a phone number field, the plurality of contact records including an initiator contact record that is associated with the initiator device;

responsive to receiving the transaction, software running on the server sending an invitation transaction to the recipient device;

responsive to the recipient device receiving the invitation transaction, the software running on the recipient device requesting acceptance of the invitation transaction;

responsive to receiving the acceptance of the invitation transaction, the software running on the recipient device sending an acceptance transaction to the server;

responsive to receiving the acceptance transaction at the server, the software running on the server selecting a set of fields from the initiator contact record and the software running on the server sending a data transaction comprising the set of fields to the recipient device;

responsive to receiving the data transaction, the software running on the recipient device adding the set of fields to a phone contact list that is local to the recipient device; and whereas, thereafter, providing the recipient device with access to the set of fields in the phone contact list that is local to the recipient device.

8. The method of claim 7, wherein the step of receiving the recipient phone number by the application running on the initiator device further comprises: receiving a restriction, the restriction setting a limit of access by the recipient device to a specific set of the fields of the initiator contact record and in the step of the software running on the server selecting the set of fields from the initiator contact record, the software running on the server selecting the set of fields from the initiator contact record based upon the restriction.

9. The method of claim 8, wherein the restriction defines a relationship between an owner of the initiator device and an owner of the recipient device as a pre-configured restriction selected from a group consisting of co-workers, friends, acquaintances, and family and each pre-configured restriction defines the set of fields of the initiator contact record.

10. The method of claim 7, wherein the step of the application receiving the recipient phone number by the application running on the initiator device further comprises receiving a time restriction and the data transaction further comprises the time restriction and the software running on the recipient device after receiving the time restriction, when determining that a current time equals the time restriction, the software running on the recipient device erases the set of fields in the phone contact list that is local to the recipient device.

11. The method of claim 10, wherein the time restriction is a date and time-of-day.

12. Program instructions tangibly embodied in a non-transitory storage medium comprising at least one instruction configured to implement a system for providing management of contact records, wherein the at least one instruction comprises:

computer readable instructions executed by a first processor of an initiator device causing the initiator device to request a recipient phone number, the initiator device having an initiator phone number;

responsive to the computer readable instructions executed by the first processor of the initiator device receiving the recipient phone number, the computer readable instructions executed by the first processor of the initiator device causing the first processor to send a transaction to a server, the transaction comprising the recipient phone number;

responsive to receiving the transaction by the server, computer readable instructions executed by a second processor of the server causing the second processor to send an invitation transaction to a recipient device that is associated with the recipient phone number;

responsive to receiving the invitation transaction at the recipient device, computer readable instructions executed by a third processor of the recipient device causing the third processor to request acceptance;

responsive to receiving the acceptance by the computer readable instructions executed by the third processor, the computer readable instructions executed by the third processor causing the third processor to send an acceptance transaction to the server;

responsive to receiving the acceptance transaction by the server, the computer readable instructions executed by the second processor of the server causing the second processor to send a data transaction comprising a set of fields from an initiator contact record that is associated with the initiator phone number to the recipient device, the set of fields being any or all fields of the initiator contact record; and responsive to receiving the data transaction by the computer readable instructions executed by the third processor of the recipient device, the computer readable instructions executed by the third processor of the recipient device causing the third processor to store the set of fields in a storage of the recipient device.

13. The program instructions tangibly embodied in the non-transitory storage medium of claim 12, wherein the computer readable instructions executed by the first processor of the initiator device further requesting a restriction for setting a relationship between the initiator device and the recipient device, and the transaction sent from the initiator device to the server comprises the restriction, and the computer readable instructions executed by the second processor use the restriction to determine which fields of the initiator contact record are included in the set of fields that are included in the data transaction.

14. The program instructions tangibly embodied in the non-transitory storage medium of claim 13, wherein the restriction defines the relationship between an initiator device owner and a recipient device owner as a pre-configured restriction selected from a group consisting of co-workers, friends, acquaintances, and family and each pre-configured restriction defines the set of fields of the initiator contact record.

15. The program instructions tangibly embodied in the non-transitory storage medium of claim 12, wherein the computer readable instructions executed by the first processor of the initiator device further controls the first processor to request a time restriction, and after receiving the time restriction, the computer readable instructions executed by the first processor of the initiator device further controls the first processor to include the time restriction in the transaction, and the computer readable instructions executed by the second processor of the server further controls the second processor to include the time restriction in the data transaction, and the computer readable instructions executed by the third processor of the recipient device controls the third processor to receive the time restriction with the data transaction and when the computer readable instructions executed by the third processor determine that a current time equals or is greater than the time restriction, the computer readable instructions executed by the third processor of the recipient device controls the third processor to delete the set of fields from the storage of the recipient device.

16. The program instructions tangibly embodied in the non-transitory storage medium of claim 15, wherein the time restriction comprises a date and time.

\* \* \* \* \*